United States Patent [19]
Yano

[11] Patent Number: 6,134,052
[45] Date of Patent: Oct. 17, 2000

[54] VARIABLE-POWER TYPE OBSERVATIONAL OPTICAL SYSTEM AND A VARIABLE-POWER TYPE EYEPIECE LENS SYSTEM

[75] Inventor: Takaaki Yano, Hokkaido, Japan

[73] Assignee: Asahi Kogaku Kogyo Kabushiki Kaisha, Tokyo, Japan

[21] Appl. No.: 09/339,902

[22] Filed: Jun. 25, 1999

[30] Foreign Application Priority Data

Jun. 26, 1998 [JP] Japan ................................ 10-181032

[51] Int. Cl.⁷ ................................................ G02B 15/14
[52] U.S. Cl. ......................... 359/689; 396/374; 396/379
[58] Field of Search .................................. 396/374, 148, 396/296, 232, 379, 380, 381; 359/689, 690, 687, 686, 379, 380

[56] References Cited

U.S. PATENT DOCUMENTS

| | | | |
|---|---|---|---|
| 5,504,624 | 4/1996 | Kato ......................................... | 359/687 |
| 5,734,509 | 3/1998 | Ueno ........................................ | 359/689 |
| 5,734,930 | 3/1998 | Hagiwara ................................. | 396/50 |
| 5,983,029 | 11/1999 | Yamada et al. ........................... | 396/51 |

FOREIGN PATENT DOCUMENTS 6175048  6/1994  Japan .
7-34061  4/1995  Japan .

*Primary Examiner*—Georgia Epps
*Assistant Examiner*—Tim Thompson
*Attorney, Agent, or Firm*—Greenblum & Bernstein, P.L.C.

[57] ABSTRACT

A variable-power type eyepiece lens system, in a variable-power type observational optical system, comprises, a positive first lens group including a negative meniscus lens element and a bi-convex positive lens element which are cemented together; a second lens group including a single plastic-made bi-convex lens element having at least one aspherical surface; a third lens group including a single plastic-made bi-concave lens element having at least one aspherical surface; wherein an object image by the objective lens system is formed between the second and third lens groups, and when variable power is performed from the long focal length extremity towards the short focal length extremity, the second lens group is moved closer to the first lens group, and the third lens group is moved away from the first lens group, and the following conditions are satisfied: $1.5<\Delta LD/M<3.0$ ... (1) $1.8<f2/fS<2.6$ ... (2) wherein M: the magnification ratio of the eyepiece lens system; $\Delta LD$: the change of the overall length of the eyepiece lens system upon variable power being performed; f2: the focal length of the second lens group; and fS: the focal length of the overall system of the eyepiece lens system at the short focal length extremity.

6 Claims, 25 Drawing Sheets

(PUPIL DIAMETER) φ3

-0.1    0.1
SPHERICAL
ABERRATION
CHROMATIC
ABERRATION

W= 19.5°

-0.5    0.5
ASTIGMATISM

W= 19.5°

-3 (%) 3
DISTORTION

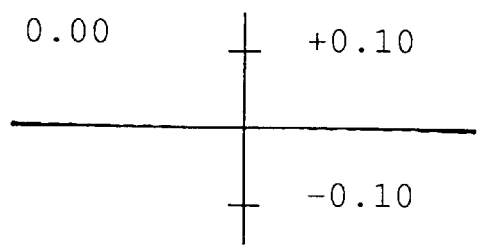
FIG.3A Y= 0.00
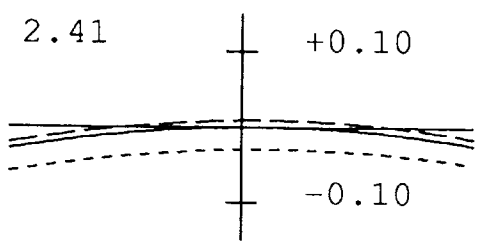
FIG.3B Y= 2.41
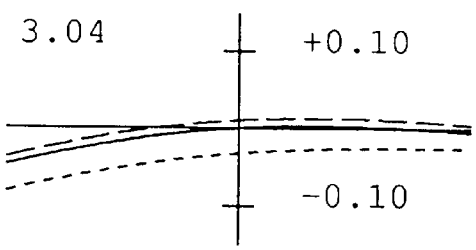
FIG.3C Y= 3.04
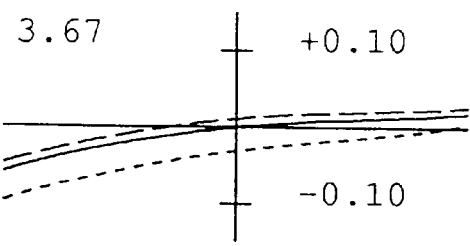
FIG.3D Y= 3.67
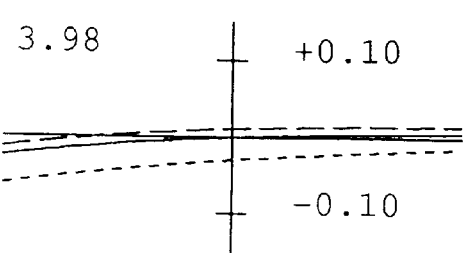
FIG.3E Y= 3.98
——— d line
- - - - - g line
– – – C line (PUPIL DIAMETER) φ3

—— d line
······ g line
- - - - C line

-0.3  0.3
SPHERICAL
ABERRATION
CHROMATIC
ABERRATION

W= 20.0°

—— S
- - M

-0.3  0.3
ASTIGMATISM

W= 20.0°

-3 (%) 3
DISTORTION

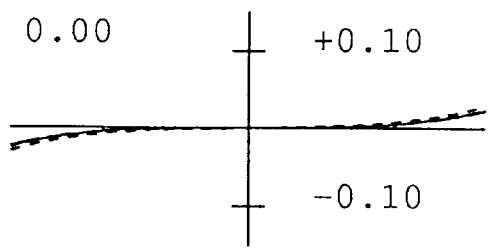
FIG.6A Y= 0.00
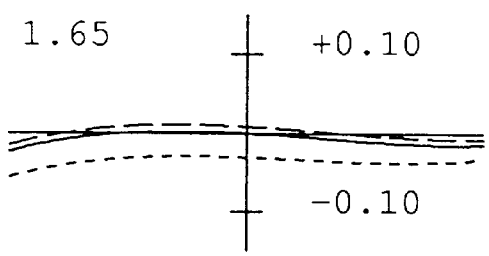
FIG.6B Y= 1.65
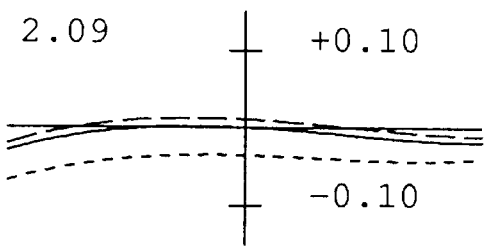
FIG.6C Y= 2.09
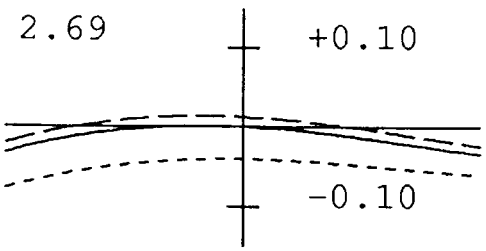
FIG.6D Y= 2.69
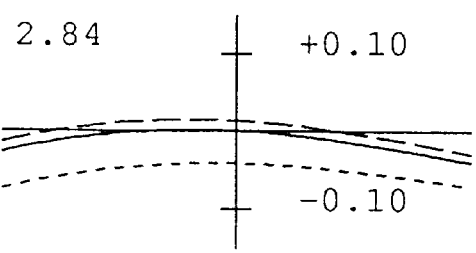
FIG.6E Y= 2.84
——— d line
········ g line
— — — C line (PUPIL DIAMETER) φ3

—— d line
······ g line
--- C line

-0.5    0.5
SPHERICAL
ABERRATION
CHROMATIC
ABERRATION

W= 22.0°

—— S
--- M

-0.3    0.3
ASTIGMATISM

W= 22.0°

-3 (%) 3
DISTORTION

FIG.9A  Y= 0.00
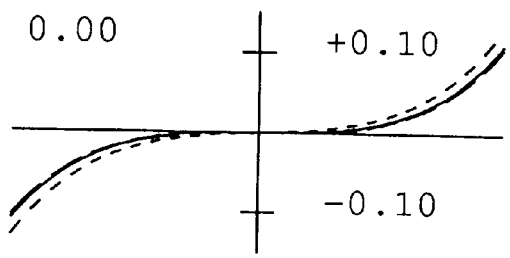
FIG.9B  Y= 1.25
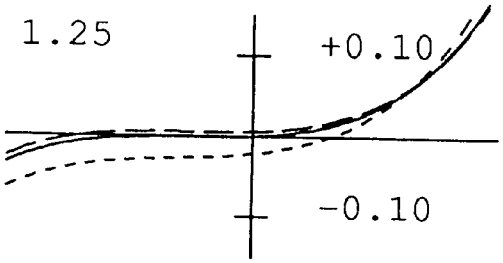
FIG.9C  Y= 1.58
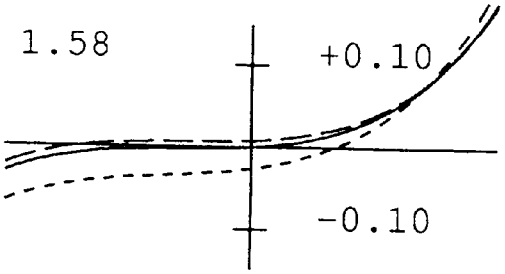
FIG.9D  Y= 1.92
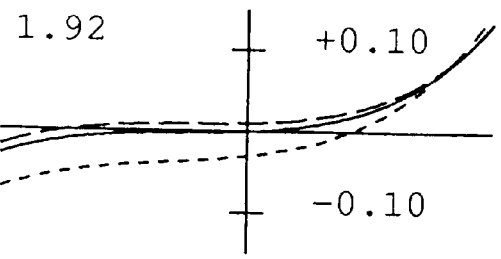
FIG.9E  Y= 2.37
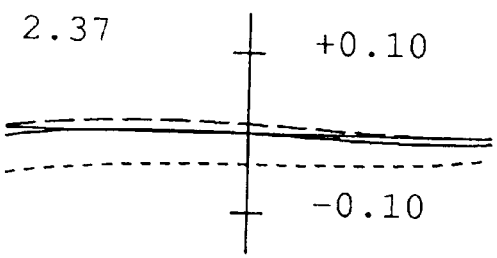
——— d line
- - - - - g line
– – – C line (PUPIL DIAMETER) φ3

—— d line
······ g line
---- C line

SPHERICAL
ABERRATION
CHROMATIC
ABERRATION

W=19.5°

—— S
-- M

ASTIGMATISM

W=19.5°

-3 (%) 3
DISTORTION

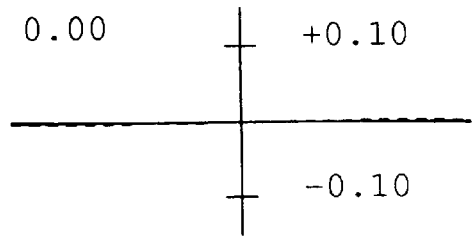
FIG.12A Y= 0.00
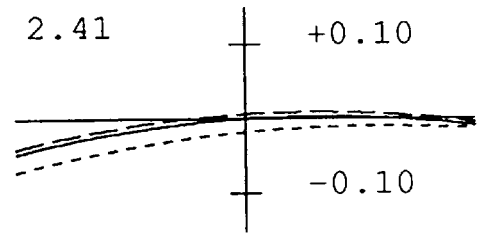
FIG.12B Y= 2.41
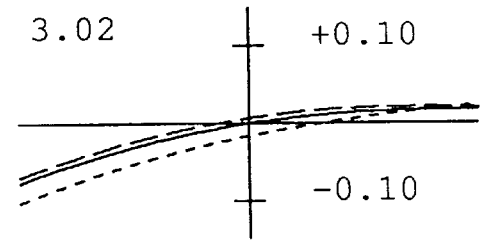
FIG.12C Y= 3.02
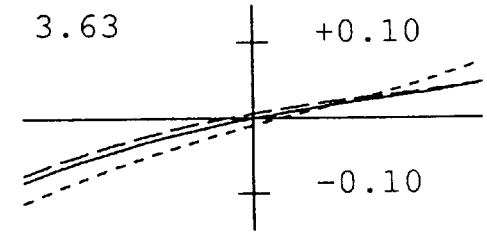
FIG.12D Y= 3.63
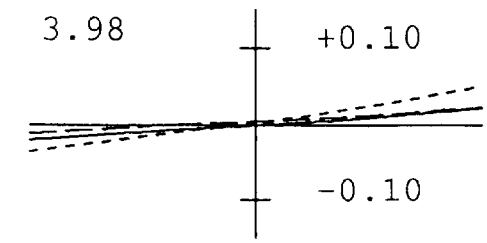
FIG.12E Y= 3.98
——— d line
-------- g line
— — — C line (PUPIL DIAMETER) φ3

-0.3    0.3
SPHERICAL
ABERRATION
CHROMATIC
ABERRATION

—— d line
------ g line
— — C line

W= 20.0°

-0.3    0.3
ASTIGMATISM

—— S
— — M

W= 20.0°

-3 (%) 3
DISTORTION

FIG.15A Y= 0.00
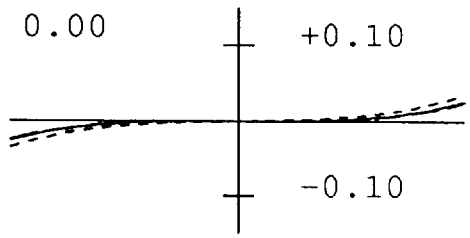
FIG.15B Y= 1.63
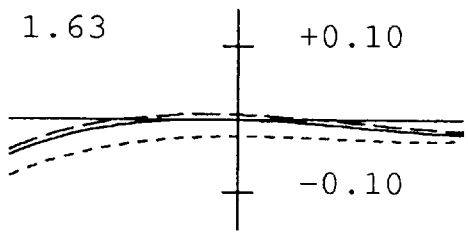
FIG.15C Y= 2.07
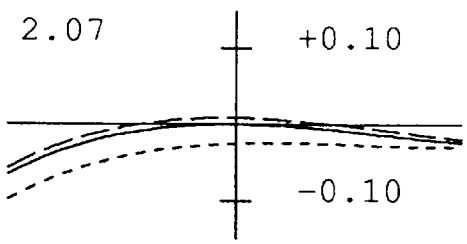
FIG.15D Y= 2.66
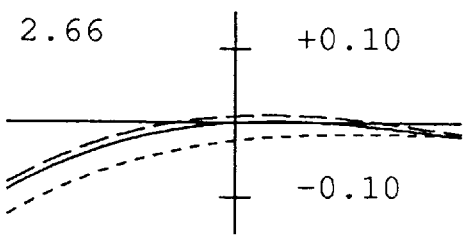
FIG.15E Y= 2.81
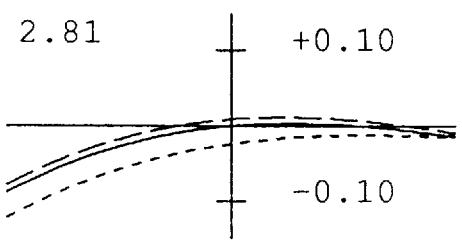
——— d line
------- g line
— — — C line (PUPIL DIAMETER) φ3

—— d line
······ g line
- - - C line

-0.5  0.5
SPHERICAL
ABERRATION
CHROMATIC
ABERRATION

W= 22.0°

—— S
- - M

-0.3  0.3
ASTIGMATISM

W= 22.0°

-3 (%) 3
DISTORTION

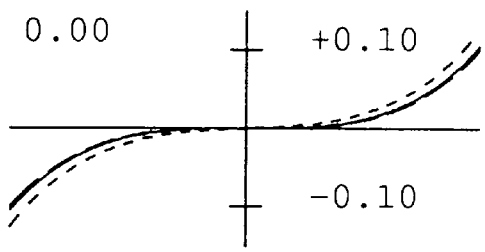
FIG.18A Y= 0.00
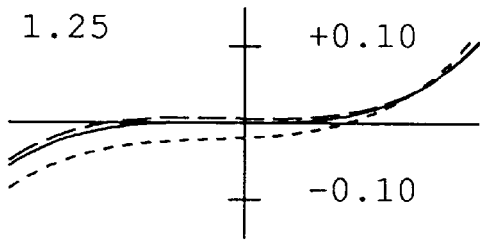
FIG.18B Y= 1.25
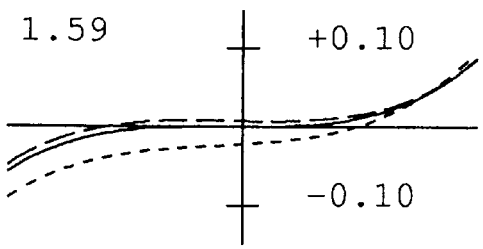
FIG.18C Y= 1.59
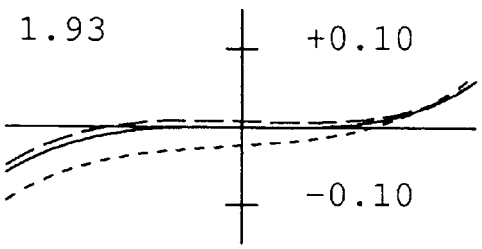
FIG.18D Y= 1.93
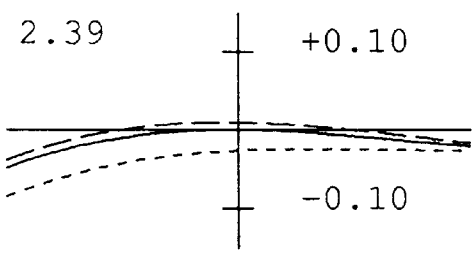
FIG.18E Y= 2.39
——— d line
-------- g line
— — — C line (PUPIL DIAMETER) φ3

—— d line
······ g line
— — C line

-0.1   0.1
SPHERICAL
ABERRATION
CHROMATIC
ABERRATION

W=19.5°

—— S
— — M

-0.5   0.5
ASTIGMATISM

W=19.5°

-3 (%) 3
DISTORTION

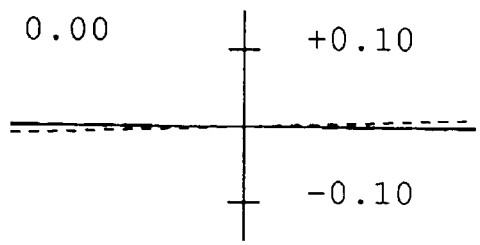
FIG.21A  Y= 0.00
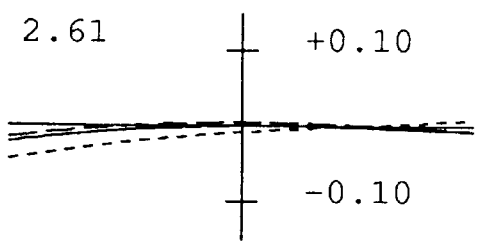
FIG.21B  Y= 2.61
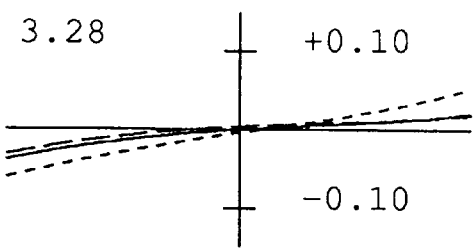
FIG.21C  Y= 3.28
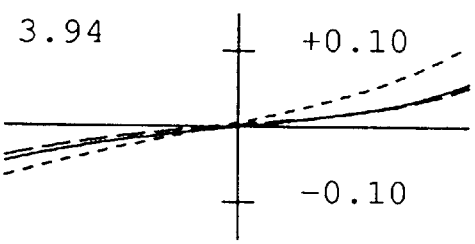
FIG.21D  Y= 3.94
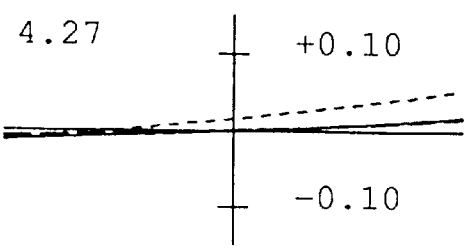
FIG.21E  Y= 4.27
——— d line
- - - - - g line
— — — C line FIG.22
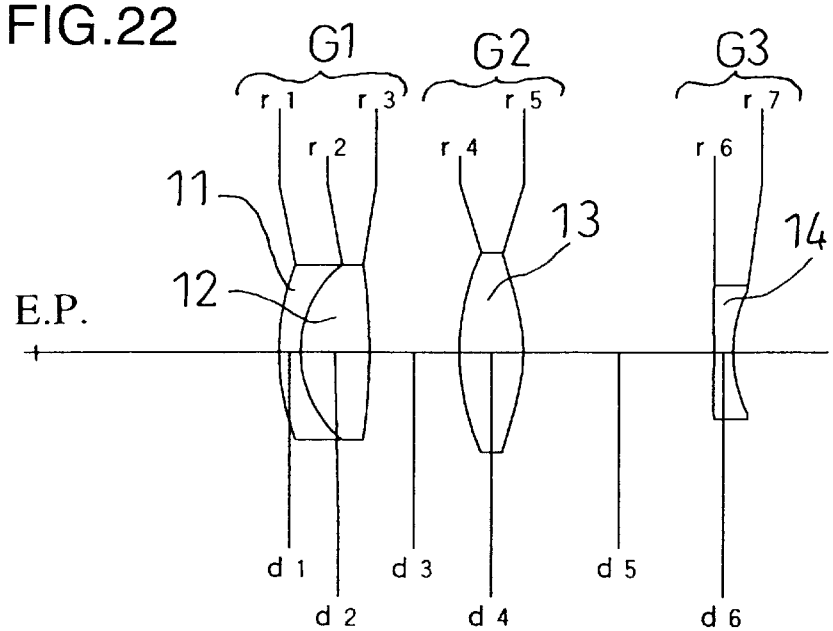
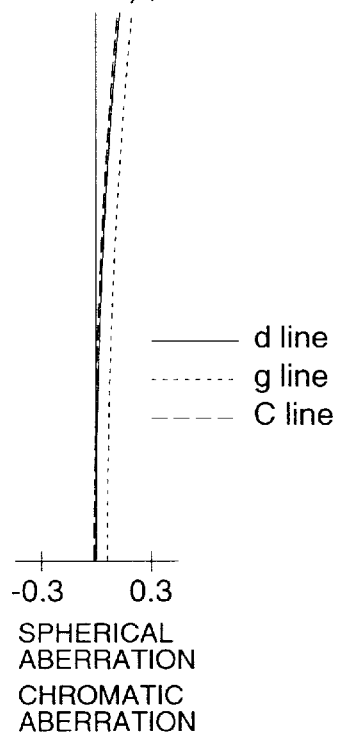
Fig.23A
(PUPIL DIAMETER) $\phi 3$
—— d line
······· g line
- - - C line
-0.3   0.3
SPHERICAL
ABERRATION
CHROMATIC
ABERRATION
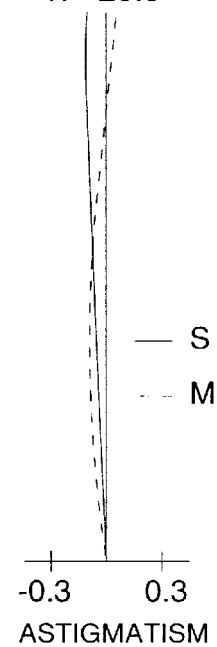
Fig.23B
W= 20.0°
—— S
- - M
-0.3   0.3
ASTIGMATISM
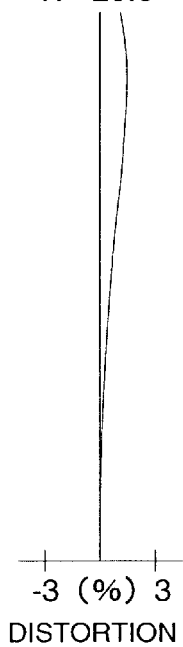
Fig.23C
W= 20.0°
-3 (%) 3
DISTORTION

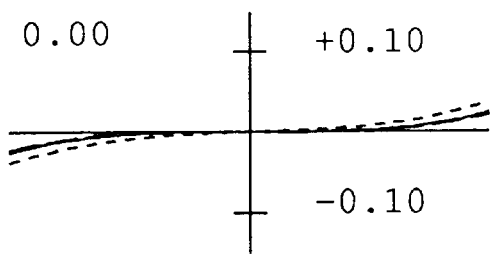
FIG.24A Y= 0.00  +0.10 / −0.10
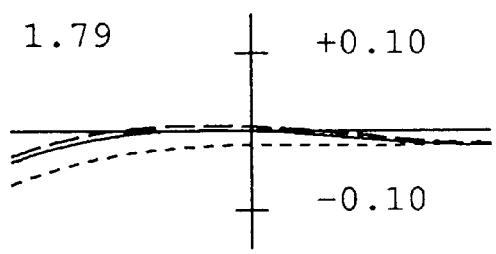
FIG.24B Y= 1.79  +0.10 / −0.10
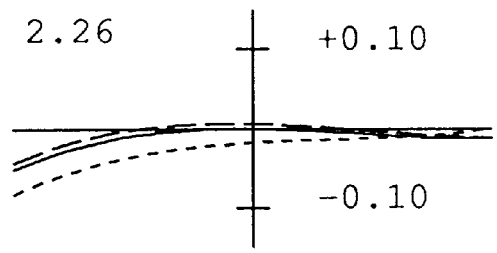
FIG.24C Y= 2.26  +0.10 / −0.10
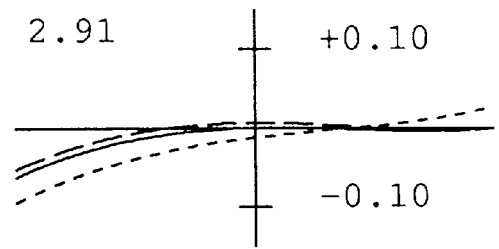
FIG.24D Y= 2.91  +0.10 / −0.10
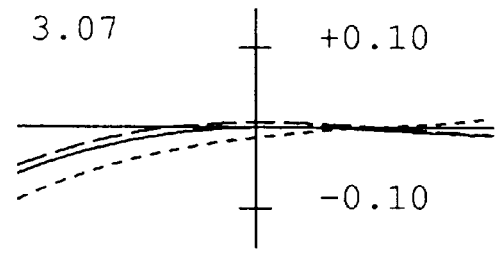
FIG.24E Y= 3.07  +0.10 / −0.10
——— d line
------ g line
— — — C line (PUPIL DIAMETER) φ3

-0.5   0.5
SPHERICAL
ABERRATION
CHROMATIC
ABERRATION

——— d line
------ g line
— — C line

W= 22.0°

-0.3   0.3
ASTIGMATISM

— S
-- M

W= 22.0°

-3 (%) 3
DISTORTION

FIG.27A  Y= 0.00
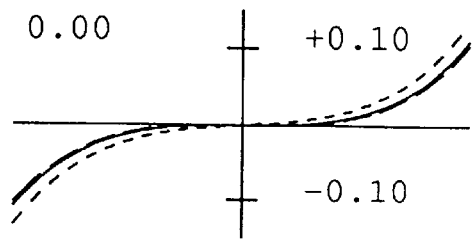
FIG.27B  Y= 1.34
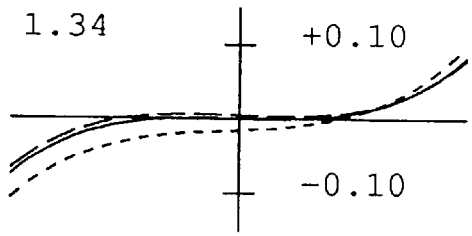
FIG.27C  Y= 1.69
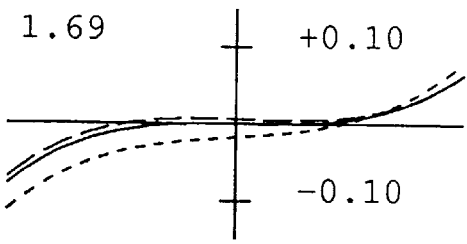
FIG.27D  Y= 2.07
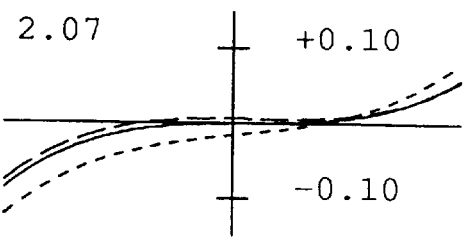
FIG.27E  Y= 2.56
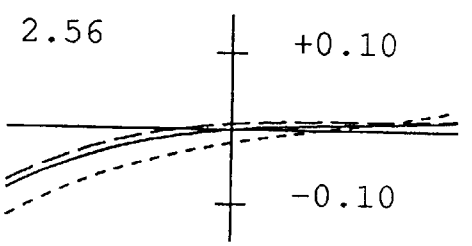
——— d line
- - - - - g line
— — — C line (PUPIL DIAMETER) φ3

-0.1    0.1
SPHERICAL
ABERRATION
CHROMATIC
ABERRATION

— d line
······ g line
— — C line

W=19.5°

-0.5    0.5
ASTIGMATISM

— S
- - M

W=19.5°

-3 (%) 3
DISTORTION

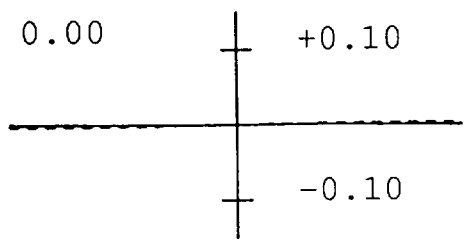
FIG.30A Y= 0.00 +0.10 / −0.10
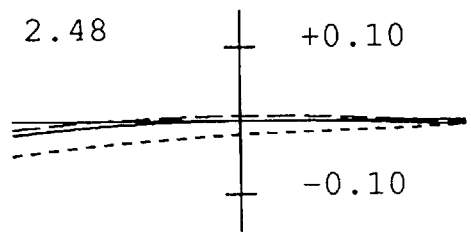
FIG.30B Y= 2.48 +0.10 / −0.10
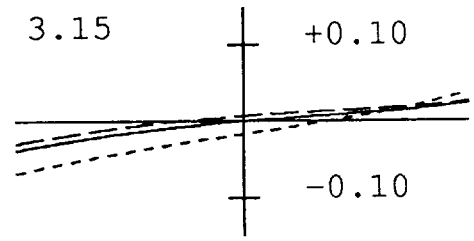
FIG.30C Y= 3.15 +0.10 / −0.10
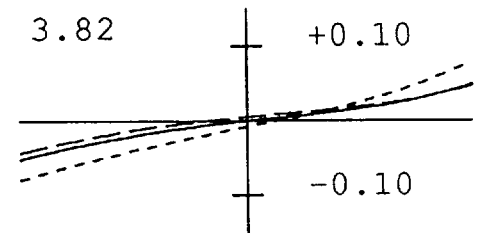
FIG.30D Y= 3.82 +0.10 / −0.10
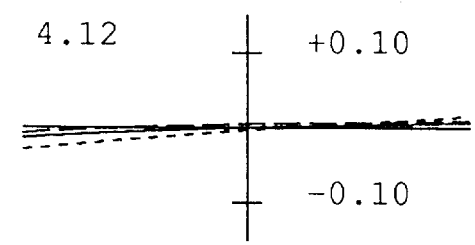
FIG.30E Y= 4.12 +0.10 / −0.10
——— d line
- - - - - g line
— — — C line (PUPIL DIAMETER) φ3

— d line
······ g line
— — C line

-0.3   0.3
SPHERICAL
ABERRATION
CHROMATIC
ABERRATION

W= 20.0°

— S
-- M

-0.3   0.3
ASTIGMATISM

W= 20.0°

-3 (%) 3
DISTORTION

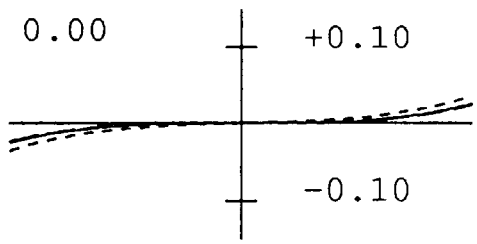
FIG.33A Y= 0.00
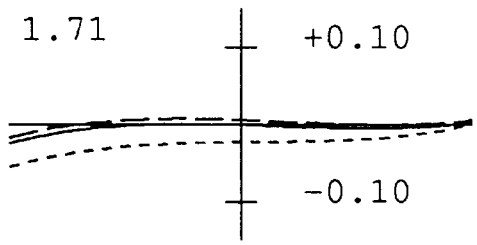
FIG.33B Y= 1.71
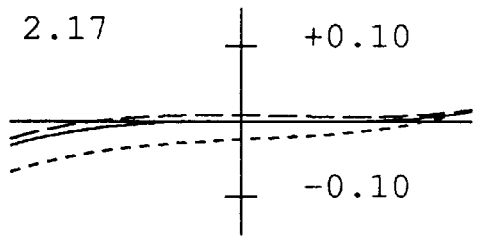
FIG.33C Y= 2.17
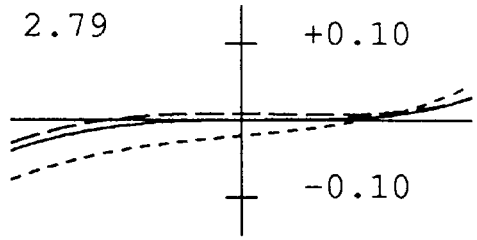
FIG.33D Y= 2.79
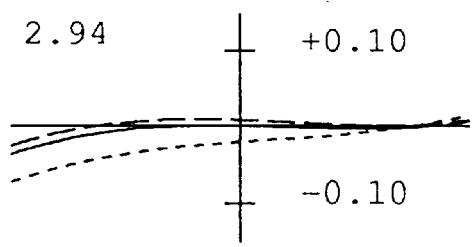
FIG.33E Y= 2.94
———— d line
- - - - - - g line
— — — C line (PUPIL DIAMETER) φ3

—— d line
------ g line
--- C line

-0.5　0.5
SPHERICAL
ABERRATION
CHROMATIC
ABERRATION

W= 22.0°

— S
-- M

-0.3　0.3
ASTIGMATISM

W= 22.0°

-3 (%) 3
DISTORTION

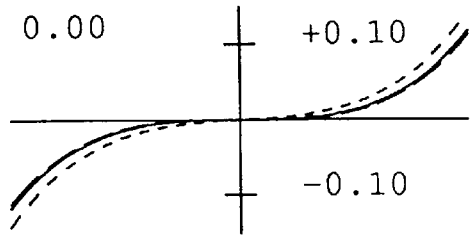
FIG.36A Y= 0.00
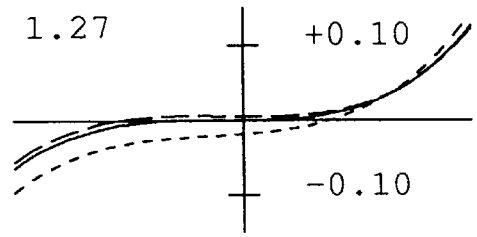
FIG.36B Y= 1.27
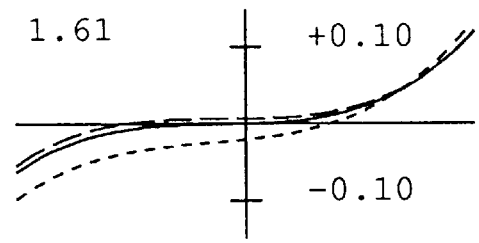
FIG.36C Y= 1.61
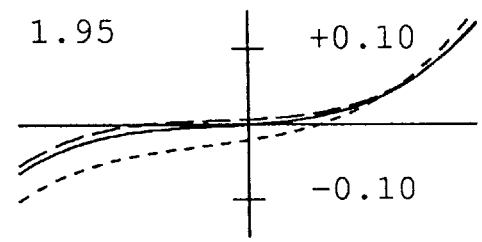
FIG.36D Y= 1.95
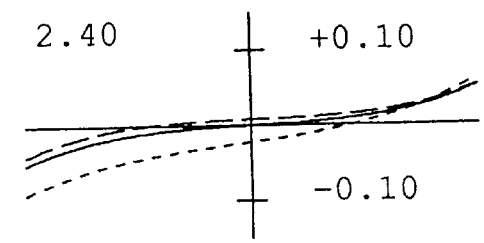
FIG.36E Y= 2.40
——— d line
-------- g line
- - - - C line

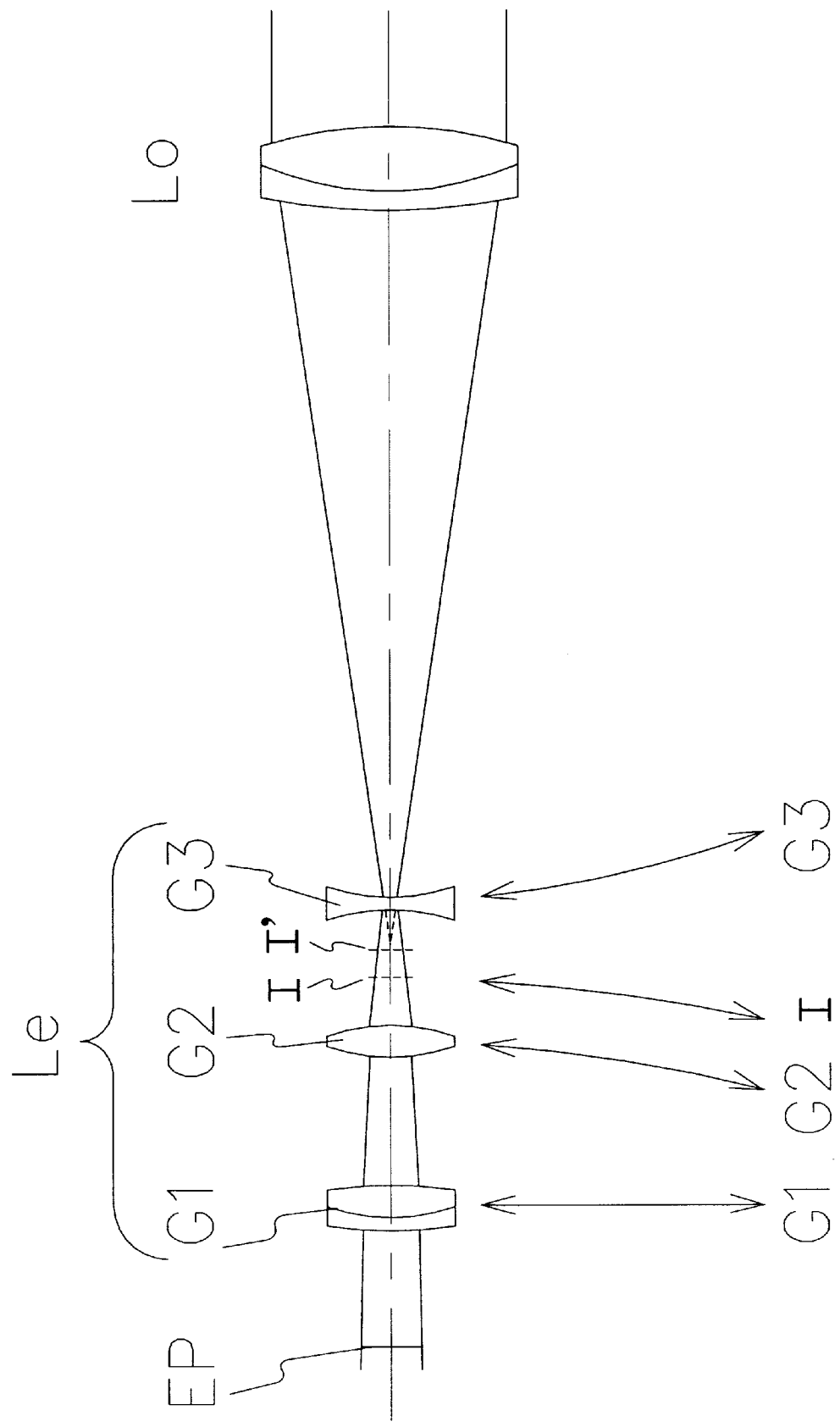

VARIABLE-POWER TYPE OBSERVATIONAL OPTICAL SYSTEM AND A VARIABLE-POWER TYPE EYEPIECE LENS SYSTEM

BACKGROUND OF THE INVENTION

1. Field of the Invention

The present invention relates to a variable-power type eyepiece lens system to be used in binoculars, telescopes and the like, and a variable-power type observational optical system which uses such a variable-power type eyepiece lens system.

2. Description of the Related Art

In a variable-power type observational optical system having an objective lens system and an eyepiece lens system in this order from the object, at least two types of lens systems have been known, that is, a type where variable power is performed by varying the focal length of the objective lens system, and another type where variable power is performed by varying the focal length of the eyepiece lens system. The above mentioned variable-power type eyepiece lens system is a type of a lens system in which an object image formed by an objective lens system is observed through the process of variable power. For example, U.S. Pat. No. 5,734,509 and Japanese Unexamined Patent Publication No.6-175048 have disclosed the above types of optical systems. These variable-power type eyepiece lens systems have five lens elements constituting three lens groups, and variable power is performed by moving the second and third lens groups, which are counted from the side of the eye-point, in the opposite directions with respect to the object image which is formed between the second and third lens groups. In these variable-power type eyepiece lens systems of the prior art, the eye-relief is relatively longer, and aberrations are satisfactorily corrected. However, the overall length of these optical systems are long, and the amount of change in the overall length of the optical system is large when variable power is performed. Moreover, in the embodiments of these optical systems disclosed in the above mentioned US patent and Japanese Unexamined Patent Publication, the five lens elements are provided to constitute three lens groups, and hence, the manufacturing costs of these optical systems are high.

SUMMARY OF THE INVENTION

It is an object of the present invention to provide a variable-power type eyepiece lens system in which an overall length is relatively short, the amount of change in the overall length upon variable power being performed is small, aberrations are satisfactorily corrected, the lens arrangement is simple, and the production costs thereof are low, and to provide a variable-power type observational optical system which is provided with the above variable-power type eyepiece lens system.

As explained, the present invention relates to an improvement on a lens arrangement of a variable-power type eyepiece lens system. However, it should be noted that the present invention utilizes a lens arrangement of the prior art in which the three lens group system is constituted by a positive lens group, the other positive lens group and the negative lens group in this order from the eye-point side, and also utilizes the way of movements, at the time of variable power, of these lens elements of the prior art.

More concretely, the present invention relates to an improvement of a variable-power type eyepiece lens system which is provided in an observational optical system having a positive objective lens system and the variable-power type eyepiece lens system in this order from the object.

In a variable-power type eyepiece lens system and a variable-power type observational optical system which uses the variable-power type eyepiece lens system, according to the present invention, in order to achieve the above-mentioned object, there are provided a positive first lens group including a negative meniscus lens element and a bi-convex positive lens element which are cemented together, a second lens group including a single plastic-made bi-convex lens element, at least one surface of which is formed as an aspherical surface, and a third lens group including a single plastic-made bi-concave lens element, at least one surface of which is formed as an aspherical surface. An object image through the objective lens system is formed between the second and third lens groups, and when variable power is performed from the long focal length extremity towards the short focal length extremity, the second lens group is moved closer to the first lens group, and the third lens group is moved away from the first lens group, and the variable-power type observational optical system satisfies the following conditions:

$$1.5 < \Delta LD/M < 3.0 \qquad (1)$$

$$1.8 < f2/fS < 2.6 \qquad (2)$$

wherein

M designates the magnification ratio of the eyepiece lens system;

$\Delta LD$ designates the change of the overall length of the eyepiece lens system upon variable power being performed;

f2 designates the focal length of the second lens group; and fS designates the focal length of the overall eyepiece lens system at the short focal length extremity.

In the first lens group, the order of the positive and negative lens elements are not required.

Furthermore, in the variable-power type eyepiece lens system and the variable-power type observational optical system which uses the variable-power type eyepiece lens system according to the present invention, the second lens group and the third lens group are respectively formed as a single lens element having at least one aspherical surface, which materializes a lens arrangement of four lens elements constituting three lens groups, the overall length of the eyepiece lens system is made shorter, the change of the overall length of the eyepiece lens system upon variable power is reduced, and aberrations are satisfactorily corrected.

Still further, the variable-power type eyepiece lens system and the variable-power type observational optical system which uses the variable-power type eyepiece lens system according to the present invention preferably satisfy the following conditions:

$$1.0 < s1/fS < 1.5 \qquad (3)$$

$$2.0 < s2/fS < 3.5 \qquad (4)$$

$$2.0 < |f3|/fS < 3.0 \qquad (5)$$

wherein s1 designates the distance between the second principal point of the first lens group and the first principal point of the second lens group at the short focal length extremity;

s2 designates the distance between the second principal point of the second lens group and the first principal point of the third lens group at the short focal length extremity; and f3 designates the focal length of the third lens group.

In addition to the above, the variable-power type eyepiece lens system and the variable-power type observational optical system which uses the variable-power type eyepiece lens system according to the present invention preferably satisfy the following conditions:

$$-3.0 < Rb/fS < -1.5 \tag{6}$$

wherein

Rb designates the radius of curvature of the object-side surface of the second lens group.

The present disclosure relates to subject matter contained in Japanese Patent Application No.10-181032 (filed on Jun. 26, 1998) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C, 3D, and 3E are diagrams showing transverse aberration of the eyepiece lens system in FIG. 1;

FIGS. 6A, 6B, 6C, 6D and 6E are diagrams showing transverse aberration of the eyepiece lens system shown in FIG. 4;

FIGS. 9A, 9B, 9C, 9D and 9E are diagrams showing transverse aberration of the eyepiece lens system shown in FIG. 7;

FIGS. 12A, 12B, 12C, 12D and 12E are diagrams showing transverse aberration of the eyepiece lens system in FIG. 10;

FIGS. 15A, 15B, 15C, 15D and 15E are diagrams showing transverse aberration of the eyepiece lens system shown in FIG. 13;

FIGS. 18A, 18B, 18C, 18D and 18E are diagrams showing transverse aberration of the eyepiece lens system shown in FIG. 16;

FIGS. 21A, 21B, 21C, 21D and 21E are diagrams showing transverse aberration of the eyepiece lens system in FIG. 19;

FIG. 22 is a lens arrangement of the third embodiment of the variable-power type eyepiece lens system, according to the present invention, at a medium focal-length position (medium magnification);

FIGS. 23A, 23B and 23C are aberration diagrams of the eyepiece lens system shown in FIG. 22;

FIGS. 24A, 24B, 24C, 24D and 24E are diagrams showing transverse aberration of the eyepiece lens system shown in FIG. 22;

FIGS. 27A, 27B, 27C, 27D and 27E are diagrams showing transverse aberration of the eyepiece lens system shown in FIG. 25;

FIGS. 30A, 30B, 30C, 30D and 30E are diagrams showing transverse aberration of the eyepiece lens system in FIG. 28;

FIGS. 33A, 33B, 33C, 33D and 33E are diagrams showing transverse aberration of the eyepiece lens system shown in FIG. 31;

FIGS. 36A, 36B, 36C, 36D and 36E are diagrams showing transverse aberration of the eyepiece lens system shown in FIG. 34;

FIG. 37 is a lens arrangement of the variable-power type eyepiece lens system including the objective lens system, and shows the moving paths of the lens elements when variable power is being performed.

DESCRIPTION OF THE PREFERRED EMBODIMENTS

Figure 1:
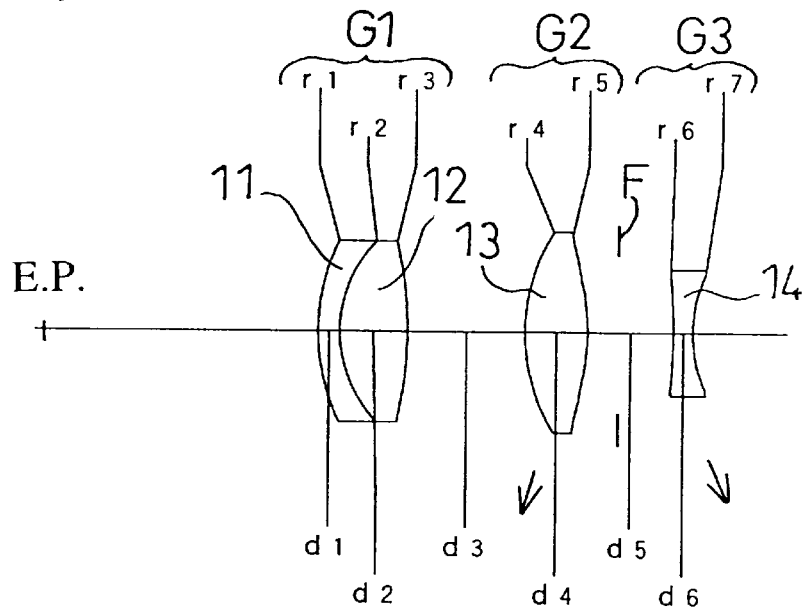
FIG. 1 is a lens arrangement of the first embodiment of a variable-power type eyepiece lens system, according to the present invention, at the long focal length extremity (the minimum magnification)
Figure 2A:
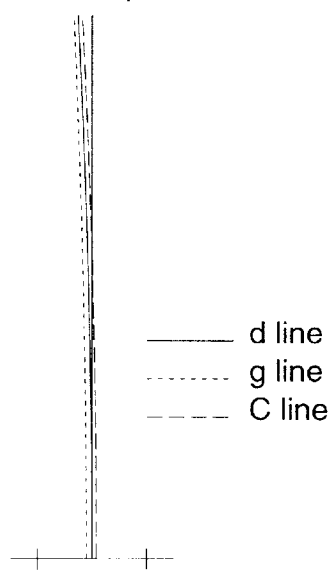
FIGS. 2A, 2B, and 2C are aberration diagrams of the eyepiece lens system in FIG. 1.
Figure 2B:
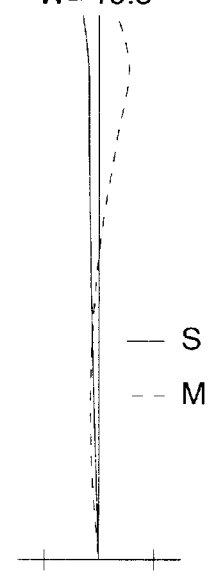
Figure 2C:
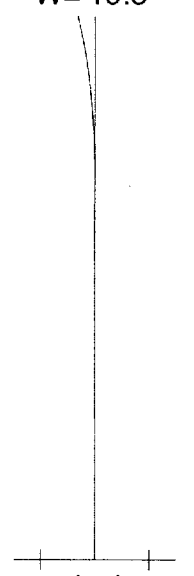

FIG. 37 is a lens arrangement of a variable-power type observational optical system having a variable-power type eyepiece lens system Le and an objective lens system Lo. The variable-power type eyepiece lens system Le includes a positive first lens group G1, a positive second lens group G2, and a negative third lens group G3, in this order from the eye-point EP. An image of an object through the objective lens system Lo is formed between the second lens group G2 and the third lens group G3. The symbol I designates the position of the object image formed through the objective lens system Lo and the third lens group G3. The symbol I' designates the position of the object image through the objective lens system when the third lens group G3 is not provided.

The first lens group G1, which is closest to the operator's eye in the variable-power type eyepiece lens system Le, is constantly fixed and is made immovable. On the other hand, the second lens group G2 and the third lens group G3 are arranged to respectively move away from the object image I when variable power is performed from the long focal length extremity L (the minimum magnification when used with the objective lens system Lo) to the short focal length extremity S (the maximum magnification when used with the objective lens system Lo), as shown in FIG. 37. Conversely, when variable power is performed from the short focal length extremity S (the maximum magnification) to the long focal length extremity L (the minimum magnification), the second and third lens groups G2 and G3 are arranged to respectively move towards the object image I.

As shown in each embodiment, the variable-power type eyepiece lens system Le includes a first lens group G1 having a negative meniscus lens element 11 and a bi-convex positive lens element 12 which are cemented together and made of glass, a second lens group constituted by a single plastic-made bi-convex lens element 13, at least one surface of which is formed as an aspherical surface, and a third lens group G3 constituted by a single plastic-made bi-concave lens element 14, at least one surface of which is formed as an aspherical surface. Miniaturization of the entire system is achieved by the above four lens elements constituting the three lens groups. Furthermore, by employing aspherical surfaces in the second and third lens groups G2 and G3, aberrations otherwise worsened by the miniaturization of the entire system can be corrected.

In general, the greater the variable power ratio is, the greater the change of the overall length of the eyepiece lens system upon variable power being performed becomes. On the other hand, if the change of the overall length of the eyepiece lens system upon variable power being performed is smaller, it is advantageous that the mechanism can be made simpler, which contributes to miniaturization of the optical devices such as binoculars and the like, and also contributes to the miniaturization of the second lens group. As a result, the correcting of aberrations, in particular, at the short focal length extremity, can be made easily. However, with respect to a predetermined magnification ratio, if the change of the overall length of the eyepiece lens system upon variable power being performed is too small, the correcting of aberrations becomes difficult, and the sensitivity of each lens element becomes too high, which increases the production costs. Throughout the specification, the sensitivity means deviation from design values because of a manufacturing error and/or a positioning error. Condition (1) numerically specifies the above situations. In other words, if $\Delta LD/M$ exceeds the upper limit, the change of the overall length of the eyepiece lens system at the time of variable power being performed with respect to a predetermined magnification ratio becomes too large. On the other hand, if $\Delta LD/M$ exceeds the lower limit, the change of the overall length of the eyepiece lens system at the time of variable power being performed with respect to a predetermined magnification ratio becomes too small, so that the sensitivity of the lens elements becomes too high.

In order to make the change of the overall length of the eyepiece lens system with respect to a predetermined magnification ratio smaller, the second lens group can be designed to have stronger power; however, if the power of the second lens group is too strong, the correcting of aberrations becomes difficult, and in particular, the correcting of spherical aberration at the short focal length extremity becomes difficult. Furthermore, if the power of the lens elements in the second lens group becomes too strong, the sensitivity of the lens elements becomes too high, which causes difficulties in manufacturing. Condition (2) numerically specifies the above situations. If $f2/fS$ exceeds the upper limit, the power of the second lens group is too weak, which makes the change of the overall length of the eyepiece lens system with respect to a predetermined magnification ratio larger. On the other hand, if $f2/fS$ exceeds the lower limit, the power of the second lens group becomes too strong, which makes the sensitivity of the lens elements high to the extent that the manufacturing of the eyepiece lens system is difficult.

Conditions (3) and (4) specify the principal-point-distances respectively between the first and second lens groups, and the second and third lens groups. Condition (5) specifies the appropriate power distribution in the third lens group by normalizing the focal length of each lens group with respect to the shortest focal length of the eyepiece lens system.

If $s1/fS$ exceeds the upper limit of condition (3), the distance between the first lens group and the second lens group becomes longer. Consequently, the aperture (effective aperture) of the second lens group becomes too large, which causes difficulties in correcting aberrations.

If the distance between the first lens group G1 and the second lens group G2 becomes shorter to the extent that $s1/fS$ exceeds the lower limit of condition (3), the power of the second lens group G2 has to be weakened from the viewpoint of power distribution. Consequently, the second lens group G2 is moved closer to the object image I because the traveling distance of the second lens group G2 for the purpose of variable power has to be made longer. Due to this move of the second lens group G2, dust or foreign matter on the lens surface is made visible; and the third lens group G3 has to bear the heavier burden of correcting aberrations, which inevitably makes the correcting of aberration difficult.

If $s2/fS$ exceeds the upper limit of condition (4), the overall length of the eyepiece system increases, which prevents miniaturization of the eyepiece system. If $s2/fS$ exceeds the lower limit of condition (4), the space to be secured for each lens group for moving becomes small, which means that the space for performing variable power can not be secured; and the sensitivity of each lens group increases, which causes the increase of manufacturing costs.

If $|f3|/fs$ exceeds the upper limit of condition (5), the power of the third lens group G3 is weakened, so that the power of the second lens group G2 has to be made relatively stronger in order to obtain a predetermined focal length of the entire lens system. Consequently, distortion and astigmatism are increased to the extent that the correcting of these aberrations is difficult.

If $|f3|/fS$ exceeds the lower limit of condition (5), coma is increased to the extent that the correcting of coma is difficult.

Condition (6) is to normalize the paraxial radius of curvature of the object-side surface of the second lens group with respect to the focal length of the overall eyepiece lens system at the short focal length extremity.

If Rb/fS exceeds the lower limit of condition (6), the field stop provided between the second lens group G2 and the third lens group G3, and the object-side surface of the second lens group G2 are positioned too much closer to each other. Consequently, dust or foreign matter on the object-side surface of the second lens group G2 is made visible, in particular, on the longer focal length side.

If Rb/fS exceeds the upper limit of condition (6), aberration-fluctuations of distortion and astigmatism due to variable power are increased to the extent that the correcting theses aberrations is difficult.

The embodiments of a variable-power type eyepiece lens system are explained. Specific numerical data of the embodiments will be described below via the tables and diagrams; wherein $\phi$ designates the diameter of the pupil, f designates the focal length of the entire lens system, W designates the half angle-of-view, fB designates the back focal distance, R designates the radius of curvature, D designates the lens thickness or distance, and $N_d$ designates the refractive index with respect to the d-line, and $v_d$ designates the Abbe number. In the diagrams of chromatic aberration represented by spherical aberrations, the solid lines and the two types of dotted lines respectively indicate chromatic aberrations with respect to the d, g and C lines. S designates the sagittal image, and M designates the meridional image.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10} \ldots;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

A10 designates a tenth-order aspherical coefficient;

Embodiment 1

Figure 4:
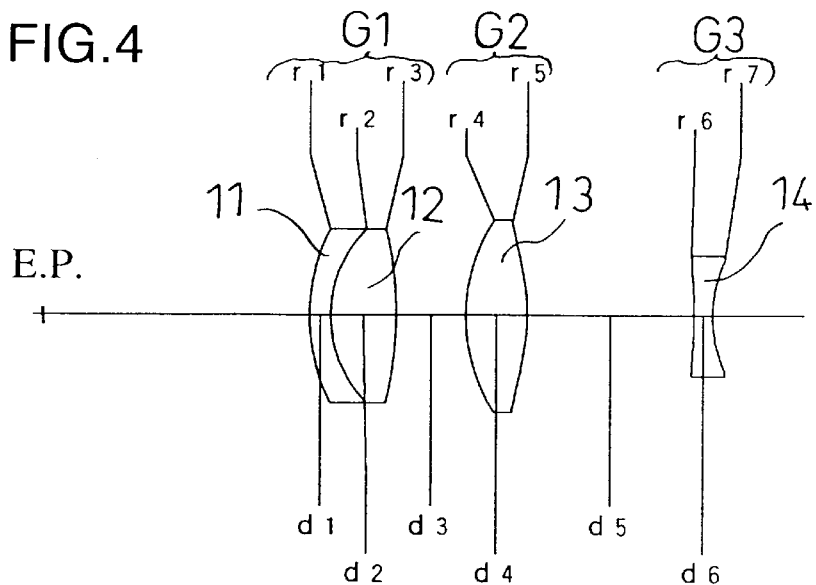
FIG. 4 is a lens arrangement of the first embodiment of the variable-power type eyepiece lens system, according to the present invention, at a medium focal-length position (medium magnification)
Figure 5A:
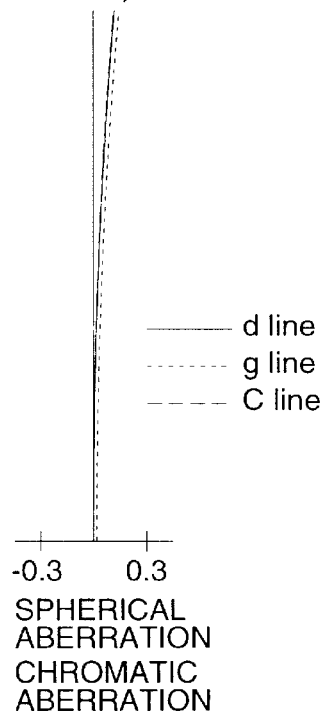
FIGS. 5A, 5B and 5C are aberration diagrams of the eyepiece lens system shown in FIG. 4.
Figure 5B:
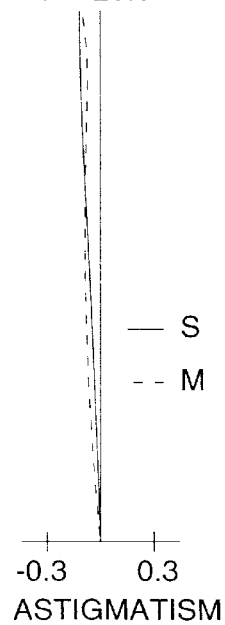
Figure 5C:
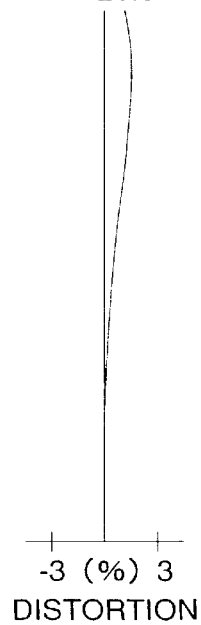
Figure 7:
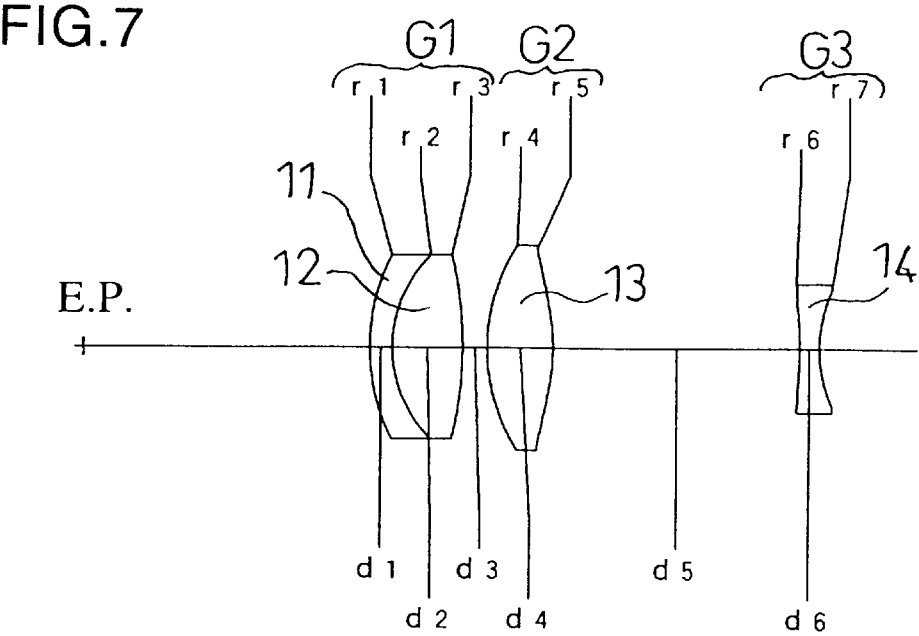
FIG. 7 is a lens arrangement of the first embodiment of the variable-power type eyepiece lens system, according to the present invention, at the short focal-length extremity (the maximum magnification)
Figure 8A:
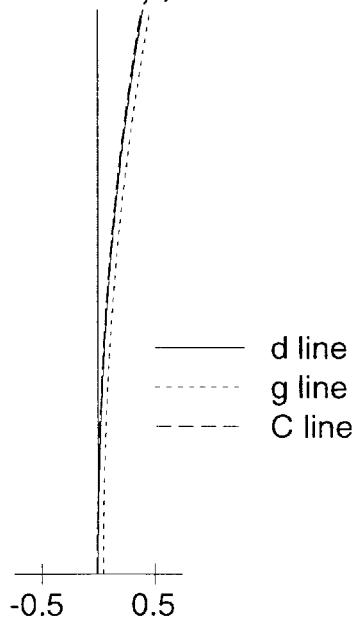
FIGS. 8A, 8B and 8C are aberration diagrams of the eyepiece lens system shown in FIG. 7.
Figure 8B:
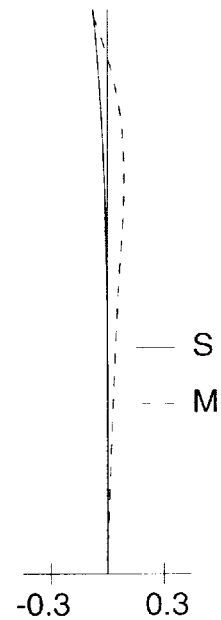
Figure 8C:
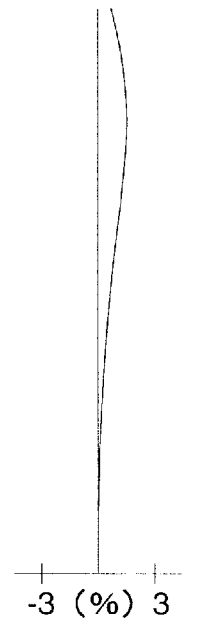

FIGS. 1 through 9 show the first embodiment of a variable-power type eyepiece lens system. FIGS. 1, 4 and 7 respectively show a lens arrangement of the variable-power type eyepiece lens system at the long focal length extremity (the minimum magnification), at a medium focal-length position (medium magnification), and at the short focal-length extremity (the maximum magnification). Table 1 shows the data thereof. FIGS. 2A, 2B, 2C, FIGS. 5A, 5B and 5C, and FIGS. 8A, 8B and 8C are the aberration diagrams of the eyepiece lens system shown in FIGS. 1, 4 and 7. Furthermore, FIGS. 3A, 3B, 3C, 3D, 3E, FIGS. 6A, 6B, 6C, 6D, 6E, and FIGS. 9A, 9B, 9C, 9D and 9E are the diagrams showing transverse aberration of the eyepiece lens system shown in FIGS. 1, 4 and 7. A field stop F is positioned between the second lens group G2 and the third lens group G3. The symbol E.P. designates the eye-point. The absolute values of the radius-of-curvatures, on the paraxial spherical surfaces, of the both surfaces of the bi-convex single lens element which constitutes the second lens group G2 are the same (shaping factor SF=(rb+ra)/(rb−ra)=0.0; wherein rb designates the radius of curvature of the paraxial spherical surface of the object-side surface, and ra designates the radius of curvature of the paraxial spherical surface of the image-side surface).

TABLE 1

$\phi$ = 3.0
f = 11.34–7.70–5.82
W = 19.5° -20.0° -22.0°
$f_B$ = 2.27– -5.17– -6.65

| Surface No. | R | D | $N_d$ | $v_d$ |
|---|---|---|---|---|
| EP | — | 13.000 | — | — |
| 1 | 14.128 | 1.500 | 1.78472 | 25.7 |
| 2 | 8.873 | 4.700 | 1.51633 | 64.1 |
| 3 | −26.650 | 8.145 -4.939 -1.634 | — | — |
| 4 | 12.889 | 4.400 | 1.49176 | 57.4 |
| 5* | −12.889 | 6.048-12.084-16.844 | — | — |
| 6* | −30.141 | 1.350 | 1.49176 | 57.4 |
| 7 | 9.584 | — | — | — |

"*" designates the aspherical surface which is symmetrical with respect to the optical axis.

Aspherical surface data (aspherical surface coefficients not indicated are zero (0.00)):

No.5: K=−1.00, A4=0.4902×10$^{-3}$, A6=−0.3651×10$^{-5}$

No.6: K=0.00, A4=0.3348×10$^{-3}$, A6=−0.6854×10$^{-5}$, A8= 0.294×10$^{-6}$

Embodiment 2

Figure 10:
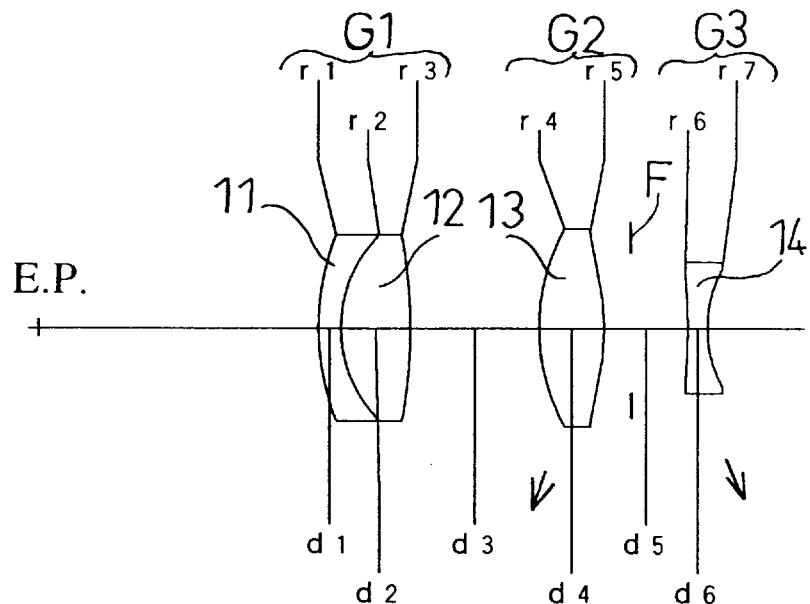
FIG. 10 is a lens arrangement of the second embodiment of a variable-power type eyepiece lens system, according to the present invention, at the long focal length extremity (the minimum magnification)
Figure 11A:
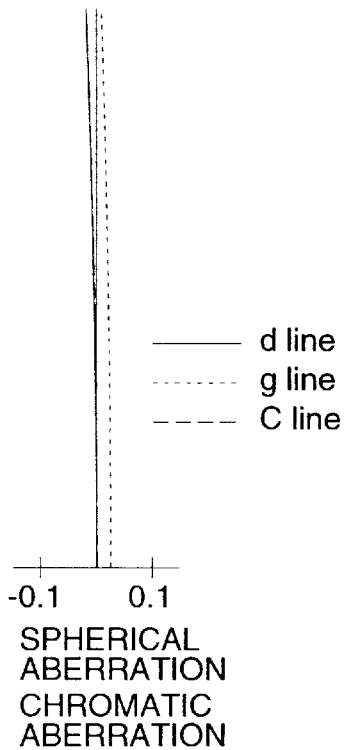
FIGS. 11A, 11B and 11C are aberration diagrams of the eyepiece lens system in FIG. 10.
Figure 11B:
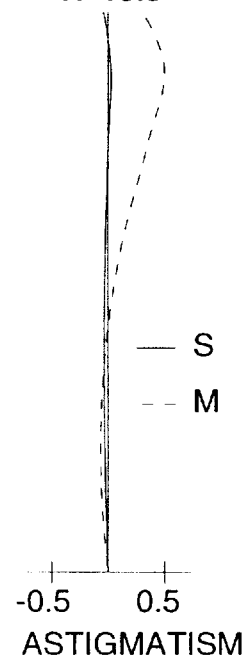
Figure 11C:
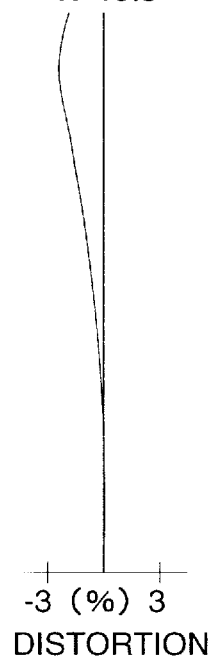
Figure 13:
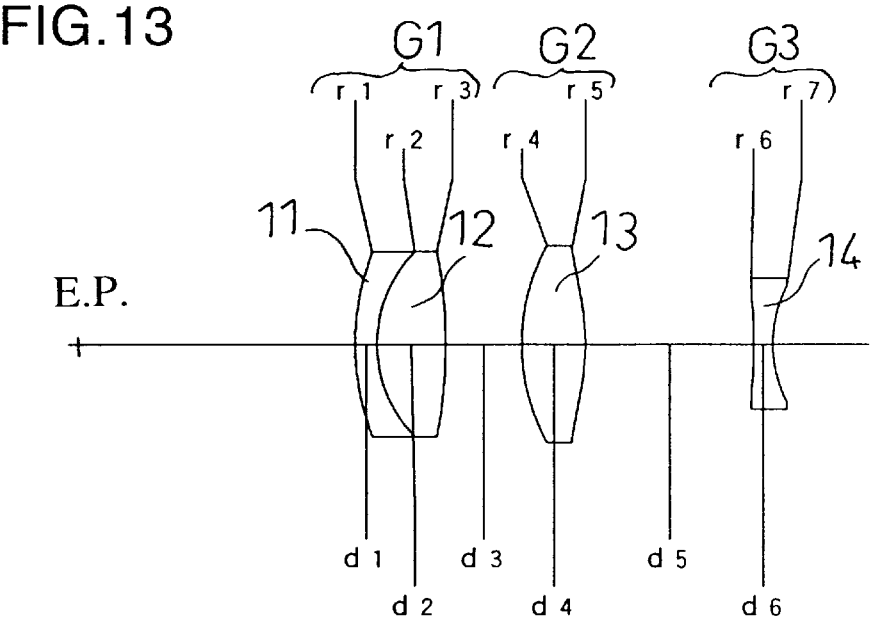
FIG. 13 is a lens arrangement of the second embodiment of the variable-power type eyepiece lens system, according to the present invention, at a medium focal-length position (medium magnification)
Figure 14A:
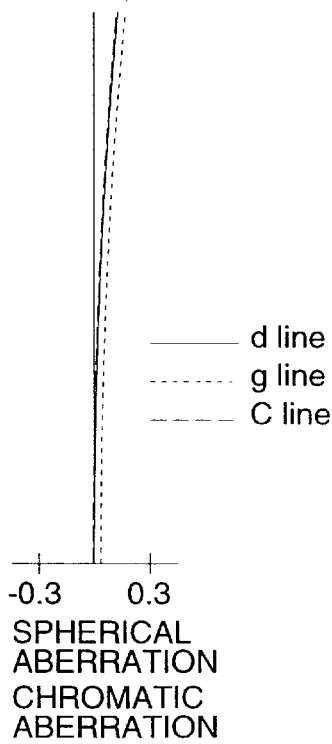
FIGS. 14A, 14B and 14C are aberration diagrams of the eyepiece lens system shown in FIG. 13.
Figure 14B:
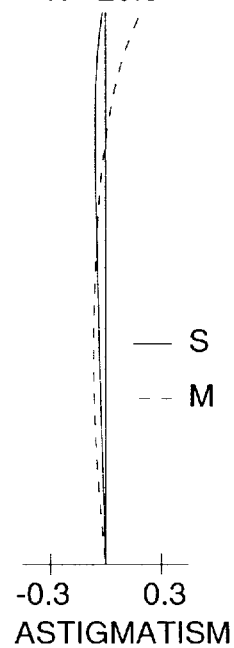
Figure 14C:
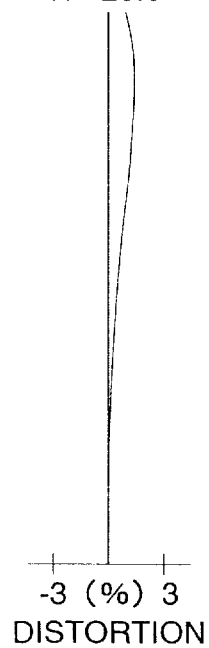
Figure 16:
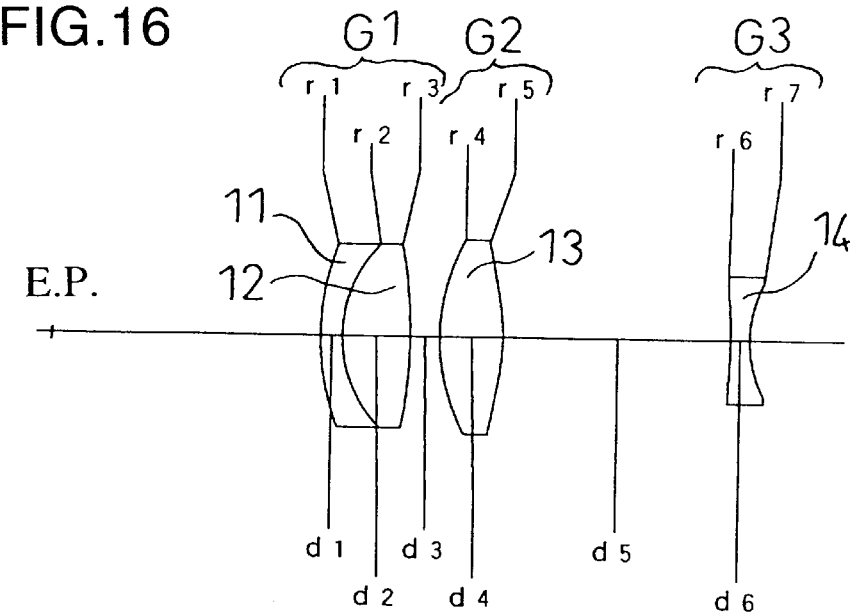
FIG. 16 is a lens arrangement of the second embodiment of the variable-power type eyepiece lens system, according to the present invention, at the short focal-length extremity (the maximum magnification)
Figure 17A:
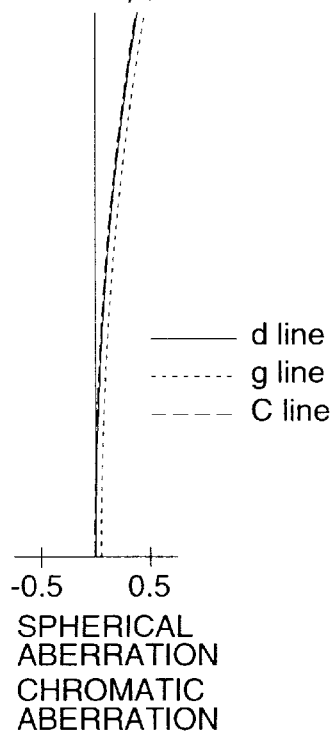
FIGS. 17A, 17B and 17C are aberration diagrams of the eyepiece lens system shown in FIG. 16.
Figure 17B:
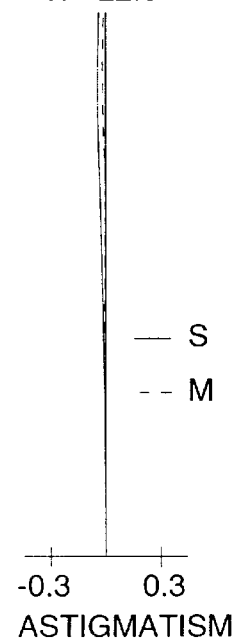
Figure 17C:
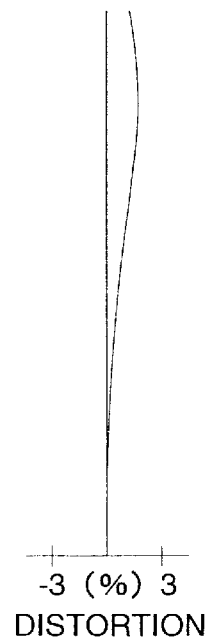

FIGS. 10 through 18 show the second embodiment of a variable-power type eyepiece lens system. FIGS. 10, 13 and 16 respectively show a lens arrangement of the variable-power type eyepiece lens system at the long focal length extremity (the minimum magnification), at a medium focal-length position (medium magnification), and at the short focal-length extremity (the maximum magnification). Table 2 shows the data thereof. FIGS. 11A, 11B, 11C, FIGS. 14A, 14B and 14C, and FIGS. 17A, 17B and 17C are aberration diagrams of the eyepiece lens system shown in FIGS. 10, 13 and 16. Furthermore, FIGS. 12A, 12B, 12C, 12D, 12E, FIGS. 15A, 15B, 15C, 15D, 15E, and FIGS. 18A, 18B, 18C, 18D and 18E are diagrams showing transverse aberration of the eyepiece lens system shown in FIGS. 10, 13 and 16. The absolute values of the radius-of-curvatures, on the paraxial spherical surfaces, of the both surfaces of the bi-convex single lens which constitutes the second lens group G2 are the same (shaping factor SF=(rb+ra)/(rb−ra)=0.0).

TABLE 2

$\phi = 3.0$
f = 11.45-7.64-5.85
W = 19.5° -20.0° -22.0°
$f_B$ = 2.31~-4.90~-6.14

| Surface No. | R | D | $N_d$ | $v_d$ |
|---|---|---|---|---|
| EP | — | 13.000 | — | — |
| 1 | 17.381 | 1.500 | 1.80518 | 25.4 |
| 2 | 8.936 | 4.700 | 1.65160 | 58.5 |
| 3 | −34.378 | 8.692-5.192-2.070 | — | — |
| 4 | 13.869 | 4.400 | 1.49176 | 57.4 |
| 5* | −13.869 | 5.722-11.745-16.073 | — | — |
| 6* | −29.911 | 1.350 | 1.49176 | 57.4 |
| 7 | 8.423 | — | — | — |

"*" designates the aspherical surface which is symmetrical with respect to the optical axis.

Aspherical surface data (aspherical surface coefficients not indicated are zero (0.00)):
No.5: K=−1.00, A4=0.4554×10$^{-3}$, A6=−0.3450×10$^{-5}$
No.6: K=0.00, A4=0.4071×10$^{-3}$, A6=0.1148×10$^{-4}$, A8=−0.1810×10$^{-5}$
A10=0.6645×10$^{-7}$ Embodiment 3

Figure 19:
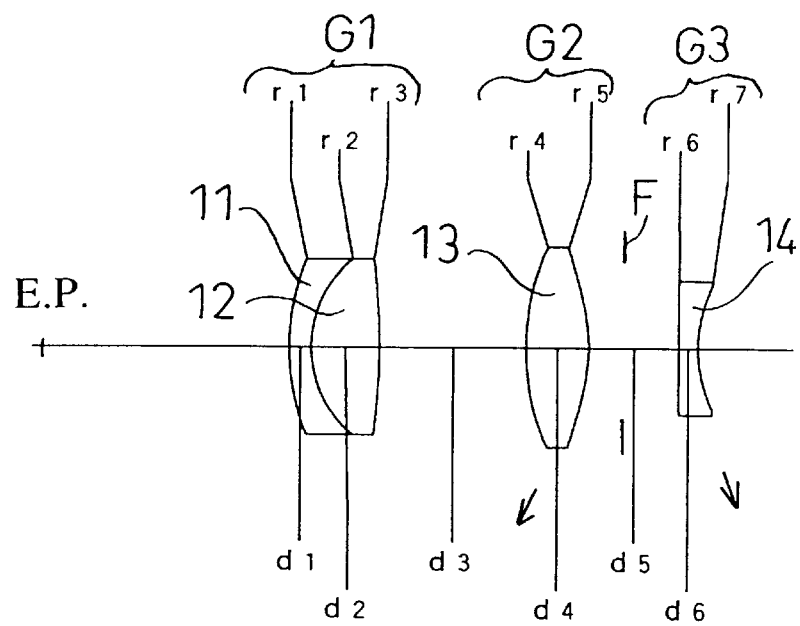
FIG. 19 is a lens arrangement of the third embodiment of a variable-power type eyepiece lens system, according to the present invention, at the long focal length extremity (the minimum magnification)
Figure 20A:
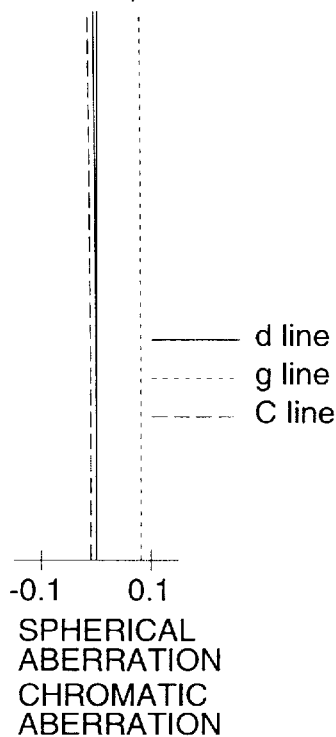
FIGS. 20A, 20B and 20C are aberration diagrams of the eyepiece lens system in FIG. 19.
Figure 20B:
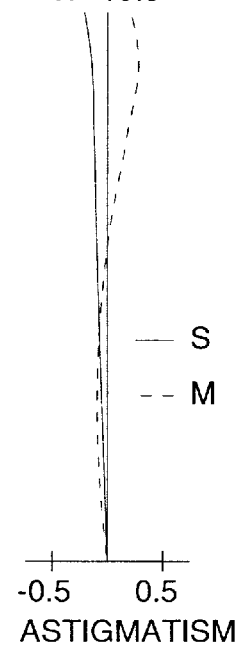
Figure 20C:
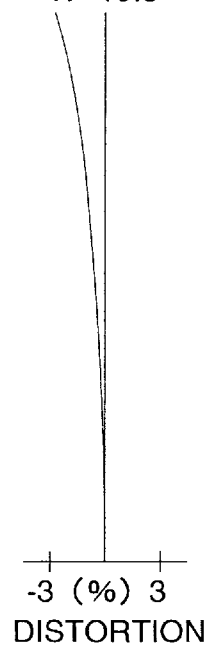
Figure 25:
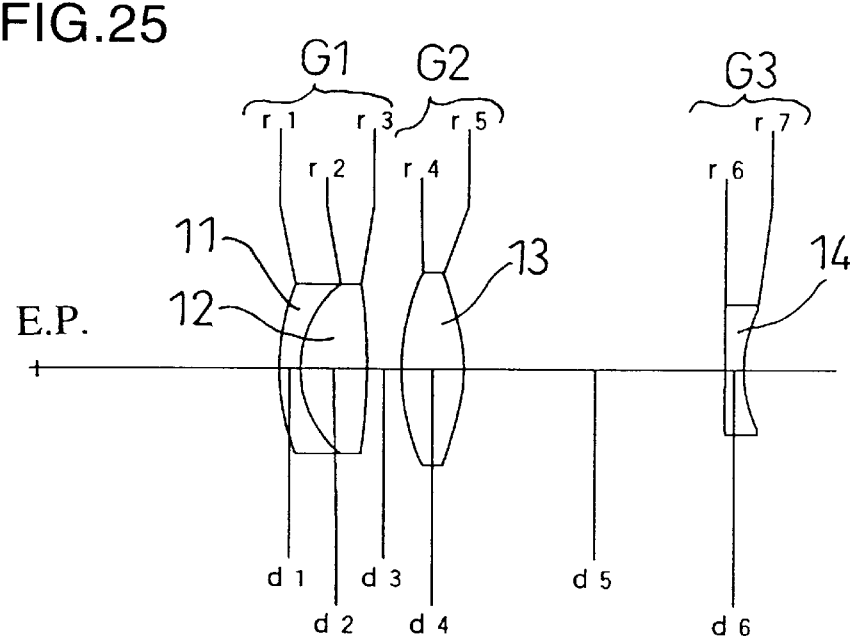
FIG. 25 is a lens arrangement of the third embodiment of the variable-power type eyepiece lens system, according to the present invention, at the short focal-length extremity (the maximum magnification)
Figure 26A:
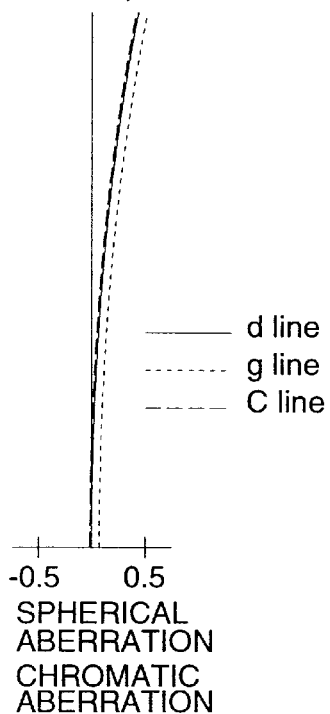
FIGS. 26A, 26B and 26C are aberration diagrams of the eyepiece lens system shown in FIG. 25.
Figure 26B:
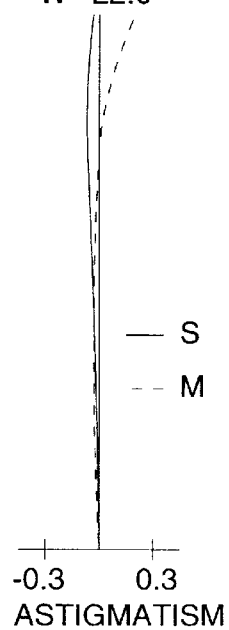
Figure 26C:
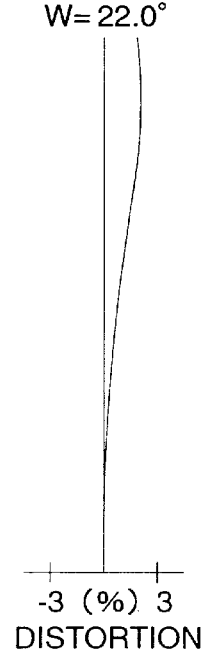

FIGS. 19 through 27 show the third embodiment of a variable-power type eyepiece lens system. FIGS. 19, 22 and 25 respectively show a lens arrangement of the variable-power type eyepiece lens system at the long focal length extremity (the minimum magnification), at a medium focal-length position (medium magnification), and at the short focal-length extremity (the maximum magnification). Table 3 shows the data thereof. FIGS. 20A, 20B, 20C, FIGS. 23A, 23B and 23C, and FIGS. 26A, 26B and 26C are aberration diagrams of the eyepiece lens system shown in FIGS. 19, 22 and 25. Furthermore, FIGS. 21A, 21B, 21C, 21D, 21E, FIGS. 24A, 24B, 24C, 24D, 24E, and FIGS. 27A, 27B, 27C, 27D and 27E are diagrams showing transverse aberration of the eyepiece lens system shown in FIGS. 19, 22 and 25. The absolute values of the radius-of-curvatures, on the paraxial spherical surfaces, of the both surfaces of the bi-convex single lens which constitutes the second lens group G2 are slightly different(shaping factor SF=(rb+ra)/(rb−ra)=−0.20).

TABLE 3

$\phi = 3.0$
f = 12.39-8.34-6.23
W = 19.5° -20.0° -22.00
$f_B$ = −2.82~−5.97~−7.68

| Surface No. | R | D | $N_d$ | $v_d$ |
|---|---|---|---|---|
| EP | — | 11.000 | — | — |
| 1 | 16.212 | 1.500 | 1.80518 | 25.4 |
| 2 | 7.793 | 4.700 | 1.65160 | 58.5 |
| 3 | −44.419 | 10.070-6.212-2.439 | — | — |
| 4 | 16.568 | 4.400 | 1.49176 | 57.4 |
| 5* | −11.027 | 6.319-13.228-18.681 | — | — |
| 6* | −90.559 | 1.350 | 1.49176 | 57.4 |
| 7 | 9.679 | — | — | — |

"*" designates the aspherical surface which is symmetrical with respect to the optical axis.

Aspherical surface data (aspherical surface coefficients not indicated are zero (0.00)):
No.5: K=−1.00, A4=0.4575×10$^{-3}$, A6=−0.3598×10$^{-5}$
No.6: K=0.00, A4=0.3112×10$^{-3}$, A6=−0.3055×10$^{-5}$, A8=0.1467×10$^{-6}$ Embodiment 4

Figure 28:
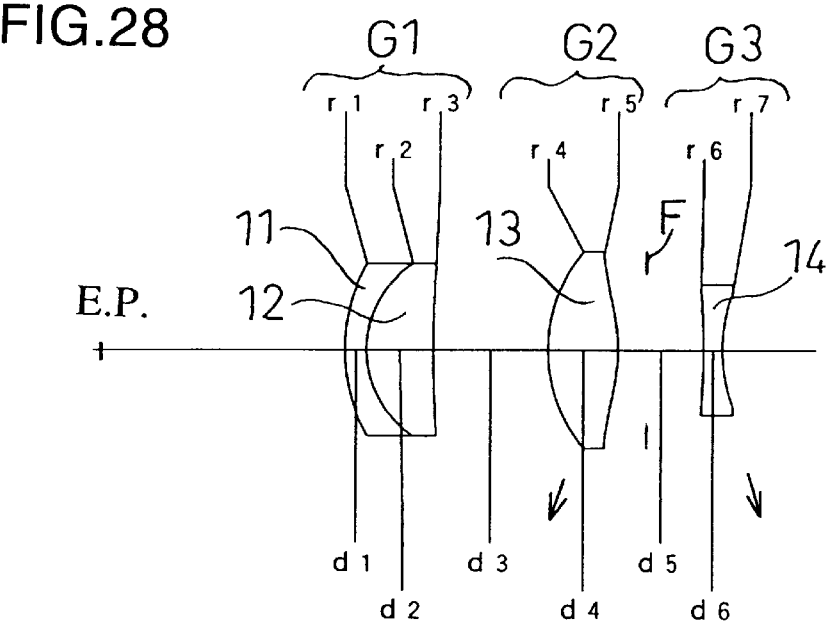
FIG. 28 is a lens arrangement of the fourth embodiment of a variable-power type eyepiece lens system, according to the present invention, at the long focal length extremity (the minimum magnification)
Figure 29A:
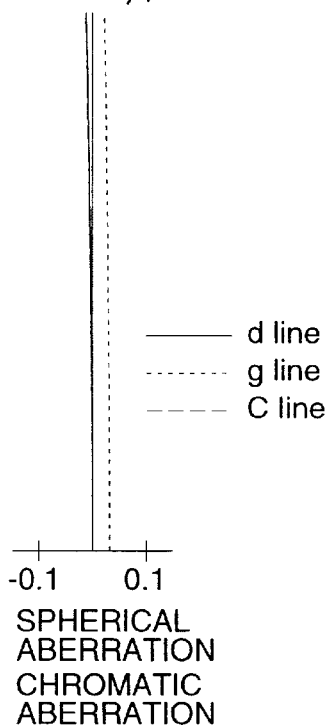
FIGS. 29A, 29B and 29C are aberration diagrams of the eyepiece lens system in FIG. 28.
Figure 29B:
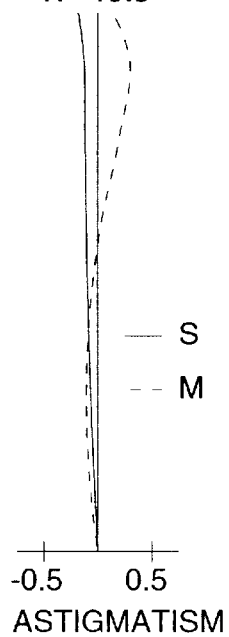
Figure 29C:
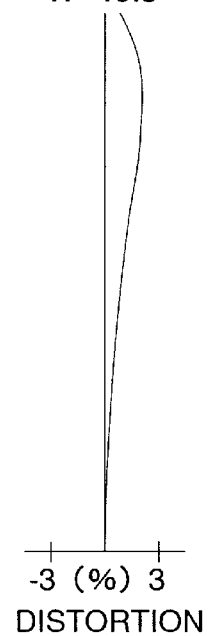
Figure 31:
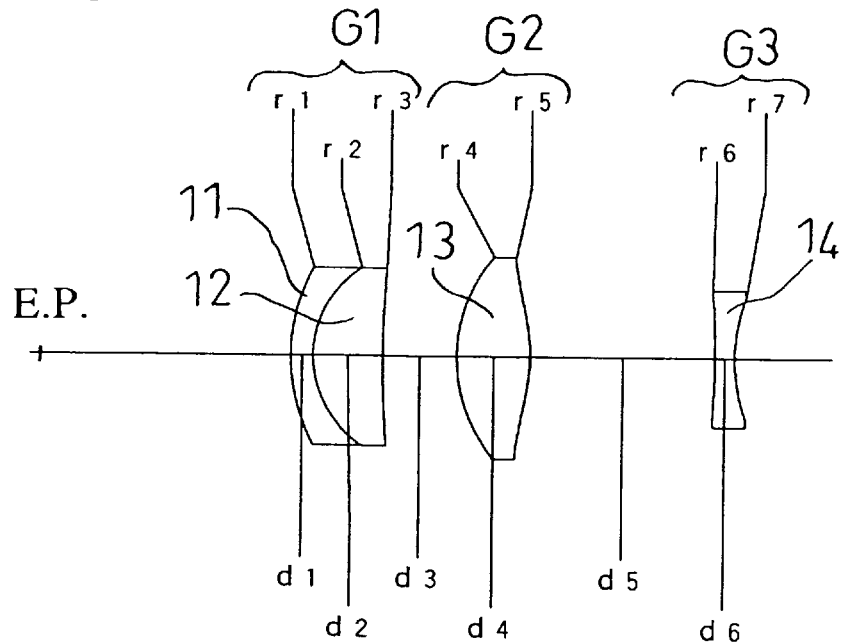
FIG. 31 is a lens arrangement of the fourth embodiment of the variable-power type eyepiece lens system, according to the present invention, at a medium focal-length position (medium magnification)
Figure 32A:
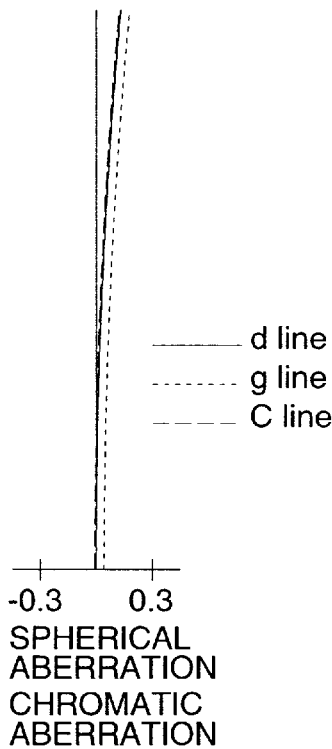
FIGS. 32A, 32B and 32C are aberration diagrams of the eyepiece lens system shown in FIG. 31.
Figure 32B:
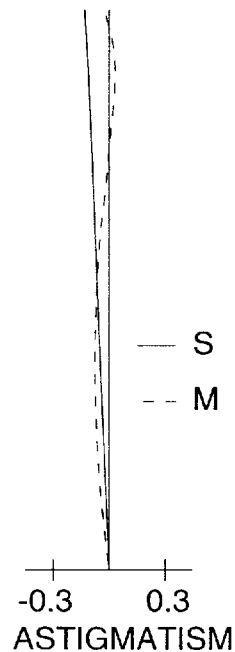
Figure 32C:
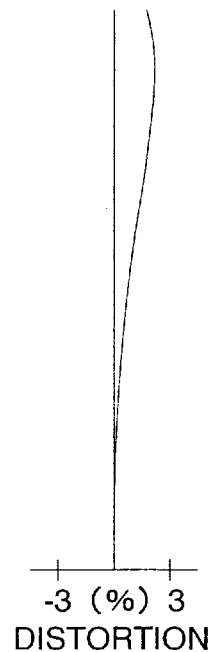
Figure 34:
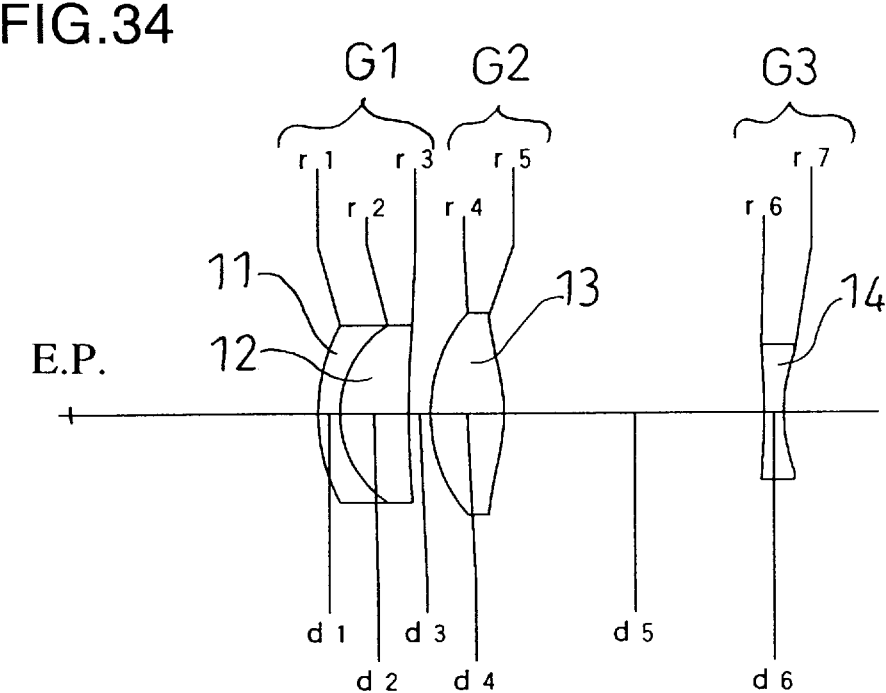
FIG. 34 is a lens arrangement of the fourth embodiment of the variable-power type eyepiece lens system, according to the present invention, at the short focal-length extremity (the maximum magnification)
Figure 35A:
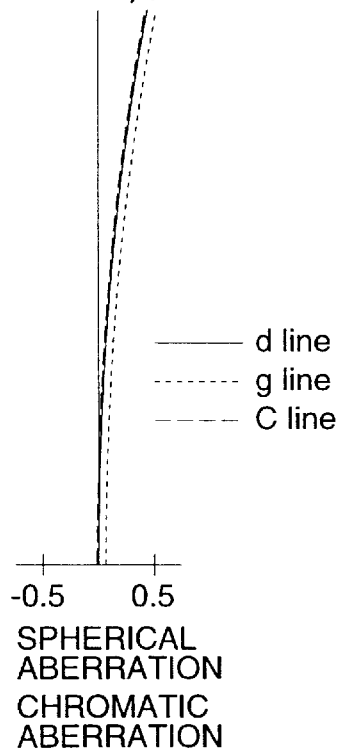
FIGS. 35A, 35B and 35C are aberration diagrams of the eyepiece lens system shown in FIG. 34.
Figure 35B:
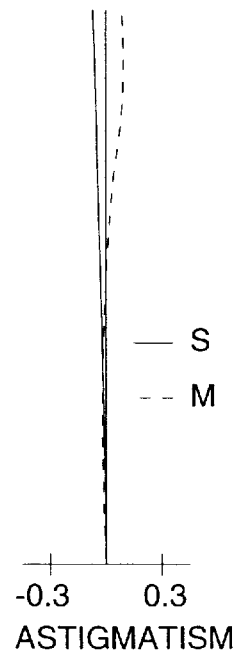
Figure 35C:
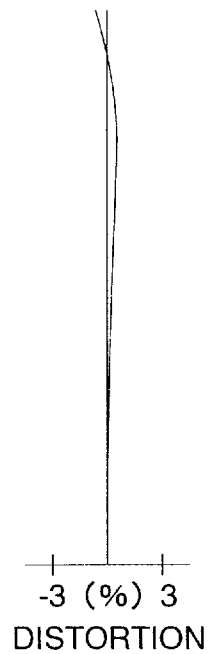

FIGS. 28 through 36 show the fourth embodiment of a variable-power type eyepiece lens system. FIGS. 28, 31 and 34 respectively show a lens arrangement of the variable-power type eyepiece lens system at the long focal length extremity (the minimum magnification), at a medium focal-length position (medium magnification), and at the short focal-length extremity (the maximum magnification). Table 4 shows the data thereof. FIGS. 29A, 29B, 29C, FIGS. 32A, 32B and 32C, and FIGS. 35A, 35B and 35C are aberration diagrams of the eyepiece lens system shown in FIGS. 28, 31 and 34. Furthermore, FIGS. 30A, 30B, 30C, 30D, 30E, FIGS. 33A, 33B, 33C, 33D, 33E, and FIGS. 36A, 36B, 36C, 36D and 36E are diagrams showing transverse aberration of the eyepiece lens system shown in FIGS. 28, 31 and 34. The absolute values of the radius-of-curvatures, on the paraxial spherical surfaces, of the both surfaces of the bi-convex single lens which constitutes the second lens group G2 are slightly different(shaping factor SF=(rb+ra)/(rb−ra)=0.01).

TABLE 4

$\phi = 3.0$
f = 11.54~7.94~5.97
W = 19.5° -20.0° -22.00
$f_B$ = −2.38~−5.88~−7.73

| Surface No. | R | D | $N_d$ | $v_d$ |
|---|---|---|---|---|
| EP | — | 11.000 | — | — |
| 1 | 12.666 | 1.500 | 1.80518 | 25.4 |
| 2 | 7.153 | 4.700 | 1.65160 | 58.5 |
| 3 | 74.150 | 8.049-4.967-1.485 | — | — |
| 4 | 10.544 | 5.000 | 1.49176 | 57.4 |
| 5* | −10.812 | 6.135-12.647-17.947 | — | — |
| 6* | −39.796 | 1.350 | 1.49176 | 57.4 |
| 7 | 11.219 | — | — | — |

"*" designates the aspherical surface which is symmetrical with respect to the optical axis.

Aspherical surface data (aspherical surface coefficients not indicated are zero (0.00)):
No.5: K=−1.00, A4=0.7647×10$^{-3}$, A6=−0.5500×10$^{-5}$
No.6: K=0.00, A4=0.1636×10$^{-3}$, A6=0.6580×10$^{-5}$, A8=−0.2714×10$^{-6}$ Table 5 shows the numerical values which correspond to each condition of each embodiment. In each embodiment, the conditions (1) through (6) are satisfied, and aberrations are sufficiently corrected.

TABLE 5

| | Embod. 1 | Embod. 2 | Embod. 3 | Embod. 4 |
|---|---|---|---|---|
| Condition (1) | 2.20 | 1.91 | 2.38 | 2.71 |
| Condition (2) | 2.39 | 2.54 | 2.28 | 1.97 |
| Condition (3) | 1.06 | 1.07 | 1.17 | 1.37 |
| Condition (4) | 3.00 | 2.52 | 2.80 | 2.77 |
| Condition (5) | 2.51 | 2.26 | 2.84 | 2.96 |
| Condition (6) | −2.21 | −2.37 | −1.77 | −1.81 |

As described above, a variable-power type eyepiece lens system can be provided with a relatively short overall length. Furthermore, in the variable-power type eyepiece lens system, the change in the overall length of the lens system upon variable-power can be made small, aberrations are satisfactorily corrected, the structure thereof is simple, and the manufacturing costs are low.

What is claimed is:

1. A variable-power type observational optical system having an objective lens system and a variable-power type eyepiece lens system, in this order from the object, said variable-power type eyepiece lens system comprising:

a positive first lens group including a negative meniscus lens element and a bi-convex positive lens element which are cemented together;

a second lens group including a single plastic-made bi-convex lens element, at least one surface of which is formed as an aspherical surface;

a third lens group including a single plastic-made bi-concave lens element, at least one surface of which is formed as an aspherical surface;

wherein an object image by said objective lens system is formed between said second and third lens groups, and when variable power is performed from the long focal length extremity towards the short focal length extremity, said second lens group is moved closer to said first lens group, and said third lens group is moved away from said first lens group, and said variable-power type observational optical system satisfies the following conditions:

$$1.5 < \Delta LD/M < 3.0$$

$$1.8 < f2/fS < 2.6$$

wherein

M designates the magnification ratio of said eyepiece lens system;

$\Delta LD$ designates the change of the overall length of said eyepiece lens system upon variable power being performed;

f2 designates the focal length of said second lens group; and fS designates the focal length of the overall system of said eyepiece lens system at the short focal length extremity.

2. The variable-power type observational optical system according to claim 1, wherein the distance between said objective lens group and said eyepiece lens system is variable so that variable-power is performed.

3. A variable-power type eyepiece lens system comprising:

a positive first lens group including a negative meniscus lens element and a bi-convex positive lens element which are cemented together;

a second lens group including a single plastic-made bi-convex lens element, at least one surface of which is formed as an aspherical surface;

a third lens group including a single plastic-made bi-concave lens element, at least one surface of which is formed as an aspherical surface;

wherein said second lens group is moved closer to said first lens group, and said third lens group is moved away from said first lens group when variable power is performed from the long focal length extremity towards the short focal length extremity, and said variable-power type eyepiece lens system satisfies the following conditions:

$$1.5 < \Delta LD/M < 3.0$$

$$1.8 < f2/fS < 2.6$$

wherein

M designates the magnification ratio of said eyepiece lens system;

$\Delta LD$ designates the change of the overall length of said eyepiece lens system upon variable power being performed;

f2 designates the focal length of said second lens group; and fS designates the focal length of the overall system of said eyepiece lens system at the short focal length extremity.

4. The variable-power type eyepiece lens system according to claim 3, wherein said variable-power type eyepiece lens system further satisfies the following conditions:

$$1.0 < s1/fS < 1.5$$

$$2.0 < s2/fS < 3.5$$

$$2.0 < |f3|/fS < 3.0$$

wherein s1 designates the distance between the second principal point of said first lens group and the first principal point of said second lens group at the short focal length extremity;

s2 designates the distance between the second principal point of said second lens group and the first principal point of said third lens group at the short focal length extremity; and f3 designates the focal length of said third lens group.

5. The variable-power type eyepiece lens system according to claim 3, wherein said variable-power type eyepiece lens system further satisfies the following conditions:

$$-3.0 < Rb/fS < -1.5$$

wherein

Rb designates the radius of curvature of the object-side surface of said second lens group.

6. The variable-power type eyepiece lens system according to claim 4, wherein said variable-power type eyepiece lens system further satisfies the following conditions:

$$-3.0 < Rb/fS < -1.5$$

wherein

Rb designates the radius of curvature of the object-side surface of said second lens group.

* * * * *